(12) United States Patent
Foung

(10) Patent No.: US 9,557,497 B2
(45) Date of Patent: Jan. 31, 2017

(54) SC OPTICAL FIBER CONNECTOR

(71) Applicant: Paul Foung, North Brunswick, NJ (US)

(72) Inventor: Paul Foung, North Brunswick, NJ (US)

(73) Assignee: ARCHTECH ELECTRONICS CORP., Dayton, NJ (US)

(*) Notice: Subject to any disclaimer, the term of this patent is extended or adjusted under 35 U.S.C. 154(b) by 8 days.

(21) Appl. No.: 14/598,249

(22) Filed: Jan. 16, 2015

(65) Prior Publication Data

US 2016/0109661 A1     Apr. 21, 2016

Related U.S. Application Data

(60) Provisional application No. 62/066,359, filed on Oct. 20, 2014, provisional application No. 62/066,361, filed on Oct. 21, 2014.

(51) Int. Cl.
*G02B 6/38* (2006.01)

(52) U.S. Cl.
CPC .......... *G02B 6/3893* (2013.01); *G02B 6/3898* (2013.01); *G02B 6/3879* (2013.01)

(58) Field of Classification Search
CPC .... G02B 6/3893; G02B 6/3879; G02B 6/3898
See application file for complete search history.

(56) References Cited

U.S. PATENT DOCUMENTS

| | | | |
|---|---|---|---|
| 6,276,839 B1* | 8/2001 | De Marchi | G02B 6/3821 385/53 |
| 7,020,376 B1* | 3/2006 | Dang | B25B 9/02 385/135 |
| 7,035,519 B2* | 4/2006 | Segroves | B25B 7/12 385/134 |
| 8,855,458 B2* | 10/2014 | Belenkiy | G02B 6/3898 385/137 |
| 9,316,791 B2 | 4/2016 | Durrant et al. | |
| 2011/0194828 A1* | 8/2011 | Hackett | G02B 6/3825 385/134 |
| 2014/0153877 A1* | 6/2014 | Isenhour | G02B 6/3807 385/78 |

* cited by examiner

*Primary Examiner* — Jerry M Blevins
*Assistant Examiner* — Erin Chiem
(74) *Attorney, Agent, or Firm* — Law Offices of S.J. Christine Yang

(57) ABSTRACT

A fiber connector is provided. In exemplary embodiments, a fiber connector may comprise an outer housing for securing a fiber cable within the housing, the housing comprising a top wall; a bottom wall disposed opposite the top side wall; a right side wall and a left side wall, each side wall having a through opening formed to receive a latch, the side walls comprising a straight portion for maintaining the latch within the through opening; and a pair of release members slidably coupled with the side walls, each release member comprising a release mechanism for releasing the fiber connector from the latch by sliding along the side walls and forcing the latch out of the through openings with the release mechanism.

12 Claims, 24 Drawing Sheets

SC OPTICAL FIBER CONNECTOR

CROSS-REFERENCE TO RELATED APPLICATIONS

The present application claims priority to U.S. Provisional Patent Application Ser. No. 62/066,359 entitled "Optical Fiber Connector," filed Oct. 20, 2014 and U.S. Provisional Patent Application Ser. No. 62/066,361 entitled "Optical Fiber Connector," filed Oct. 21, 2014, the disclosures of which are incorporated herein by reference in their entireties.

BACKGROUND

Field of the Invention

Embodiments of the present invention are generally related to connectors and methods of utilizing the same. More specifically, embodiments of the present invention relate to an optical fiber connector that may include integral forks positioned on lateral sides of the connector for releasing a connection between an adaptor and the connector, or the like.

Description of Related Art

Optical fibers are used for data transmission because of their wide bandwidth and capacity for carrying data in the form of light signals that are unaffected by electromagnetic fields. One drawback to the use of optical fibers is the difficulty involved in properly connecting two optical fibers with a connector. Signal losses in the transfer of data across an interface between optical fibers in a connector can cause substantial problems in the transfer of data. If the abutting optical fibers are not properly aligned, a substantial portion of the signal can be lost at the interface. Any misalignment of the fibers at their interface can cause a substantial portion of the signal conveying data along the optical fibers to be lost, thereby increasing the risk of data loss.

In addition to aligning the optical fibers in their respective connector parts, a connector must also ensure the quality of the interface between the optical fibers. For example, it is desirable to achieve approximately a 1 newton force of contact at the interface between their abutting ends. Any offsets, incongruities, or other defects occurring at the interface can substantially impair the quality of data transmission through the connector. If any space exists between the optical fiber tips a loss of data may occur. As such, an approximately 1 newton force should ideally be maintained at all times between optical fiber tips for better data transfer and lessening the risk of losing data.

Referring now to FIGS. 1 and 2, a conventional subscriber connector, square connector, or standard connector (hereinafter, "SC") 100 and a conventional adapter 200 are shown. A conventional SC type optical fiber connector 100 is a snap-in connector that features a push-pull connection design for quick patching of cables. A conventional SC type connector 100 has a generally rectangular shape with a square cross section. The connector 100 includes a rectangular hollow outer housing 110 comprised of a top side-wall 111, a bottom side-wall 112, a right side-wall 113 and a left side-wall 114, wherein the right side-wall 113 is opposite to the left side-wall 114 and connects with the bottom side-wall 112 and the top side-wall 111. A key 130 is formed on the top side-wall 111 and a through opening 118 is formed on each of the left and right side-walls 114, 113. A hollow inner housing 150 is placed within the outer housing 110. The inner housing 150 may move back and forth through a rectangular opening 116 on a front end of the outer housing 110.

In addition, a ferrule 140 is placed in the inner housing 150 and protrudes from a circular opening 156 on the front end of the inner housing 150 and from the opening 116 on the outer housing 110. A fiber connector 100 may be attached to one end of a fiber cable 122 and a light beam can propagate down the fiber cable 122 and emit from the ferrule 140, or the like, of the connector 100. Likewise, a light beam can be coupled into the fiber cable 122 from the end face of the ferrule 140. A spring is located inside the inner housing 150 to allow the ferrule 140 to move back and forth through the openings 116, 156. A conventional connector 100 includes an angled portion 155 for releasing the connector 100 from an adaptor 200, or the like, when the connector is snapped into the adaptor 200.

The connector 100 typically is engaged in an adapter 200, or the like with at least one interior latch 260 within the adapter, the interior latch 260 disposed on one or more sides of an interior surface of the adapter 200. The at least one interior latch 260 engages connector 100 by entering and/or snapping into the through opening 118 and holding the connector 100 in place. The connector 100 may be dislodged from the adapter 200 by pulling the connector 100 out of the adaptor 200. When a pulling force is applied to the connector 100, the angled portion 155 forces the interior latch 260 away from the center of the connector 100 and out of the through opening 118, thereby allowing the connector 100 to be released from, and pulled out of, the adaptor 200. The connection under such an arrangement in the prior art is not strong, as pulling on the connector 100 even slightly will disengage the connector 100 from the adaptor 200.

A conventional fiber adapter 200 includes a molded plastic main body 210 and a metal exterior latch 250, or the like. The main body 210 is of generally rectangular shape and has a receiving recess 215 defined by a top side-wall 211, a bottom side-wall 212, a right side-wall 213 and a left side-wall 214. A recess 216 is formed on each of the top side-wall 211, the right side-wall 213 and the left side-wall 214. These recesses 216 are positioned in communication with each other. A pair of tabs 219 extends outward from the right side-wall 213 and the left side-wall 214, respectively.

The exterior latch 250 made of metal includes two vertical portions 254 extending downward from two opposing ends of a horizontal portion 252, wherein the horizontal portion 252 is positioned in the recess 216 on the top side-wall 211 and the two vertical portions 254 are positioned in the recesses 216 on the right side-wall 213 and the left side-wall 214, respectively. The vertical portions 254 are generally rectangular and each of them has a rectangular opening. An elastic stopping portion 258 extends from a side of the opening. The stopping portion 258 is generally rectangular and extends outward and toward the tabs 219 on the main body 210. The bottom side-wall 212 may comprise a slot 230 for mating with the key 130 of the connector 100 when the connector 100 is inserted into the receiving recess 215, or the like.

Standard adaptors 200 may allow two or more connectors 100 to be coupled together. In general, an adapter 200 may comprise a second receiving recess 217 for accommodating a second connector. The two receiving recesses 215, 217 may be opposite and can both respectively receive a connector 100, or the like. When the adapter 200 is used to couple two connectors together, the two connectors are respectively inserted into the receiving recesses 215, 217. The ferrules 140 of the connectors 100 slide into a hollow sleeve and are brought into axial alignment and contact with each other. A light beam will be able to propagate from the fiber cable 122 of a connector 100 through an interface between the two ferrules 140 and then reach the fiber cable 122 of the other connector 100, and vice versa.

There are drawbacks to the use of these standard connectors 100 and adaptors 200, however. When the connector 100 is not fully snapped into the adapter 200 and a 1 newton force is not maintained between optical fiber tips, loss of data may occur. In typical setups, many optical fiber connections are made and it is difficult ensure all connectors 100 are fully snapped into place and secured within adapters 200, or the like. If the user desires to check whether the connector 100 is fully seated and snapped into the adapter 200 or the like, the user can't simply pull on the connector 100, because doing so may cause the angled portion 155 to push against the interior latch 260 and disengage the connector 100 from the adaptor 200, or the like. As such, it is not easy for the user to tell which connectors 100 are disengaged and not properly connected wherein the optical fibers are maintained tip to tip at 1 newton force. In addition, the connectors 100 may easily dislodge due to the angled portion 155 present in the connector 100 because when a relatively small pulling force is applied to the housing 100 in a direction away from the adaptor 200 or the like, the connector 100 may become dislodged.

Thus, typical connectors 100 can become dislodged from an adaptor 200 with relative ease due to the angled portion 155 of the connector 100, thereby increasing the risk of data loss. As such, an improved connector is needed that improves the reliability of the quality of the interface between two optical fibers.

SUMMARY

Embodiments of the present invention generally relate to optical fiber connectors and methods of utilizing the same. In one embodiment, fiber connector may comprise an outer housing for securing a fiber cable within the housing, the housing comprising a top wall; a bottom wall disposed opposite the top side wall; a right side wall and a left side wall, each side wall having a through opening formed to receive a latch, the side walls comprising a straight portion for maintaining the latch within the through opening; and a pair of release members slidably coupled with the side walls, each release member comprising a release mechanism for releasing the fiber connector from the latch by sliding along the side walls and forcing the latch out of the through openings with the release mechanism.

In another embodiment of the present disclosure, a fiber connector may comprise an outer housing for securing a fiber cable within the housing, the housing comprising a top wall; a bottom wall disposed opposite the top side wall; a right side wall and a left side wall, each side wall having a through opening formed to receive a latch, the side walls comprising a straight portion for maintaining the latch within the through opening; a pair of release members slidably coupled with the side walls, each release member comprising a base comprising a release projection projecting perpendicularly from a side of the base, the release projection for pushing the release members into position to release the fiber connector from the latch; two prongs extending from the base, each prong comprising a release mechanism disposed at an outermost tip of each of the prongs, the release mechanisms for releasing the fiber connector from the latch by sliding along the side walls and forcing the latch out of the through openings with the release mechanisms; and a housing projection extending substantially perpendicularly from a top surface of the top wall.

In yet another embodiment of the present disclosure, A duplex fiber connector may comprise a pair of simplex fiber connectors, each simplex fiber connector comprising an outer housing for securing a fiber cable within the housing, the housing comprising a top wall; a bottom wall disposed opposite the top side wall; a right side wall and a left side wall, each side wall having a through opening formed to receive a latch, the side walls comprising a straight portion for maintaining the latch within the through opening; and a pair of release members slidably coupled with side walls, each release member comprising a release mechanism for releasing the fiber connector from the latch by sliding along the side walls and forcing the latch out of the through openings with the release mechanism; an upper housing and a lower housing, the upper housing and the lower housing coupled together to form a pair of connector openings, wherein the pair of simplex fiber connectors are disposed within the pair of connector openings; and a slide for moving each of the release members substantially simultaneously to release the each of the simplex fiber connectors from the latches.

BRIEF DESCRIPTION OF THE DRAWINGS

So the manner in which the above-recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

Figure 1:
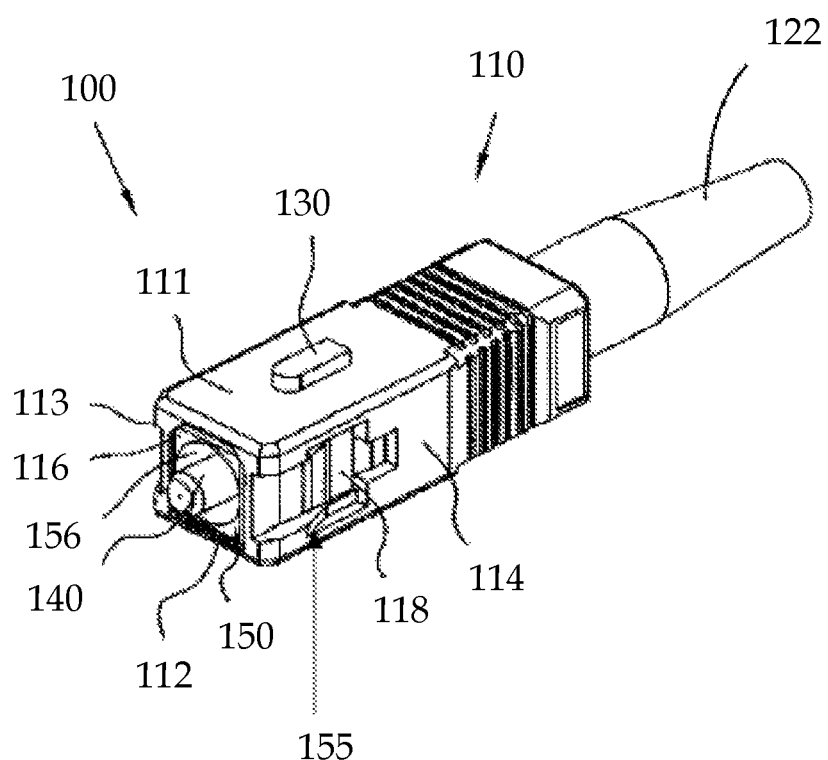
FIG. 1 depicts an elevated perspective view of a conventional optical fiber connector.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Figure 2:
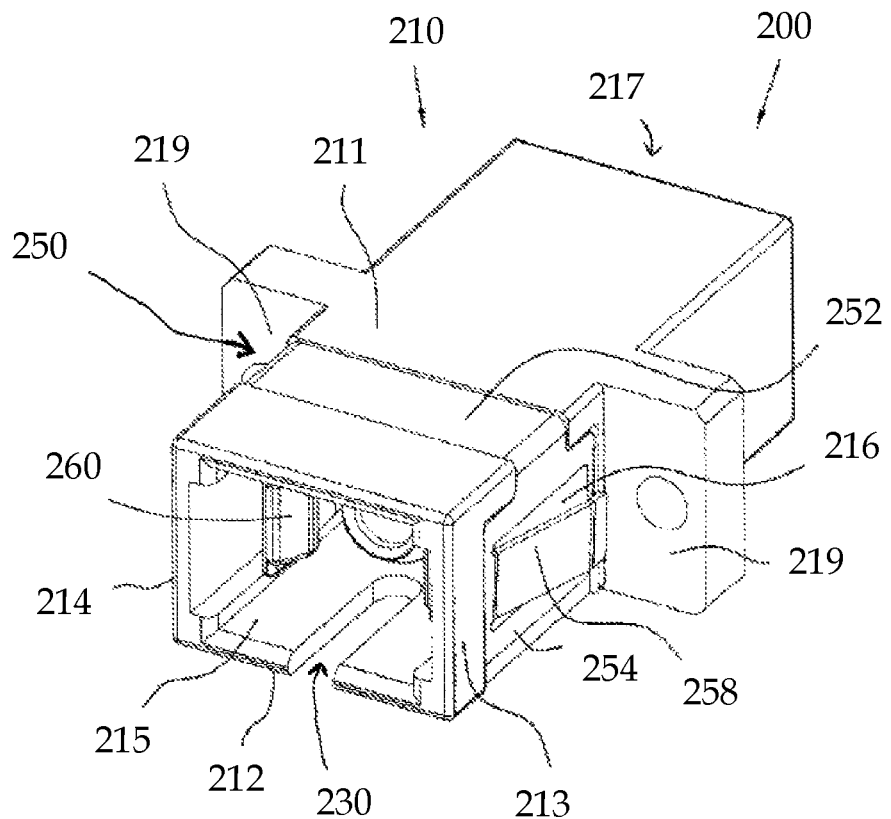
FIG. 2 depicts an elevated perspective view of a conventional optical fiber adaptor.
Figure 3:
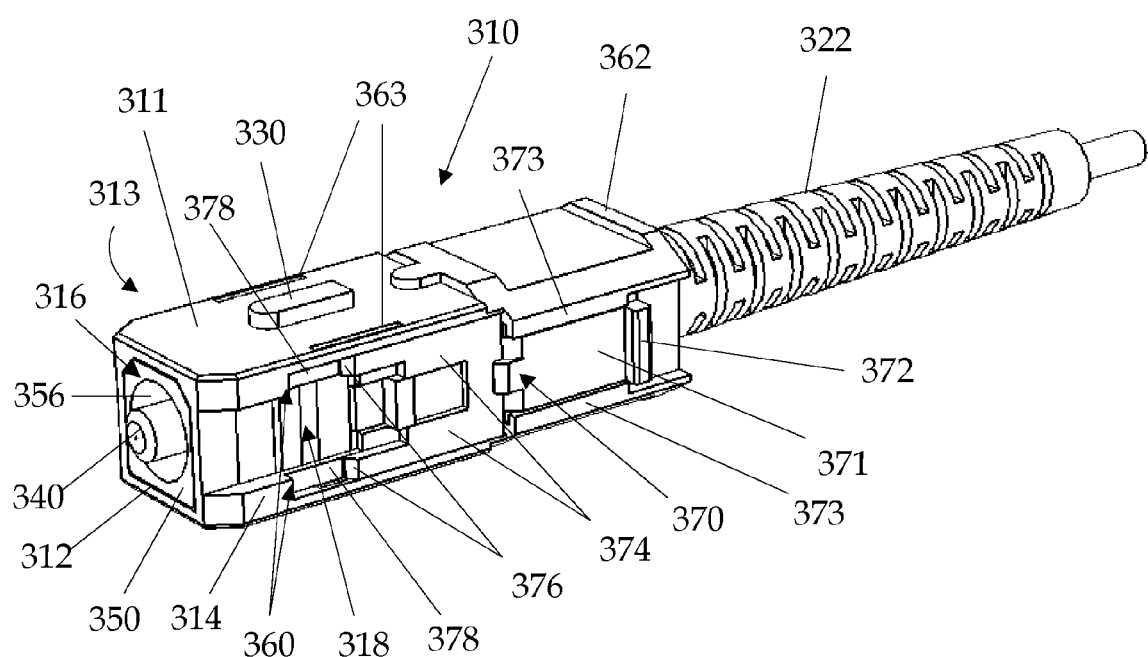
FIG. 3 depicts an elevated perspective view of an optical fiber connector in accordance with exemplary embodiments of the present disclosure.

Embodiments of the present invention are generally related to optical fiber connectors and methods of utilizing the same. More specifically, embodiments of the present invention may relate to an optical fiber connector including an integral fork for releasing a connection between an adaptor and the connector, or the like. Although SC type connectors are generally depicted in the figures, the use of elements of embodiments of the present disclosure with any type of cable connector is contemplated. For ease, the adaptor 200 depicted in FIG. 2 is used as an example throughout the present disclosure. Any type of adaptor with an interior latch 260, or the like, is contemplated by and within embodiments of the present disclosure, however FIG. 3 depicts an elevated perspective view of an optical fiber connector 300 in accordance with exemplary embodiments of the present disclosure. For ease, an optical fiber connector 300 is depicted and described herein. It is contemplated that the elements disclosed herein may be used with other types of connectors that connect two or more cables, or the like. An optical fiber connector 300 in accordance with exemplary embodiments may be a snap-in connector allowing the connector 300 to be snapped into an adaptor 200 or the like. A connector 300 may have a generally rectangular shape with a square cross section. The connector 300 may comprise a rectangular hollow outer housing 310 comprised of a top side-wall 311, a bottom side-wall 312, a right side-wall 313 and a left side-wall 314, wherein the right side-wall 313 is opposite to the left side-wall 314 and connects with the bottom side-wall 312 and the top side-wall 311. A key 330 is formed on the top side-wall 311 and a through opening 318 is formed on each of the left and right side-walls 314, 313. A hollow inner housing 350 is placed within the outer housing 310. The inner housing 350 may move back and forth through a rectangular opening 316 on a front end of the outer housing 310.

In addition, a ferrule 340 is placed in the inner housing 350 and protrudes from a circular opening 356 on the front end of the inner housing 350 and from the opening 316 on the outer housing 310. A connector 300 may be attached to one end of a fiber cable 322 and a light beam can propagate down the fiber cable 322 and emit from the ferrule 340, or the like, of the connector 300. Likewise, a light beam can be coupled into the fiber cable 322 from the end face of the ferrule 340. A spring is located inside the inner housing 350 to allow the ferrule 340 to move back and forth through the openings 316, 356. A connector 300 in accordance with exemplary embodiments of the present invention may comprise a flat portion 360 for maintaining the connector 300 within an adaptor, or the like, after the connector 300 has been snapped into the adaptor 200 and an interior latch 260, or the like, has entered into the through opening 318 behind the flat portion 360. This flat portion 360 is formed to keep the connector 300 in the adaptor 200 and substantially prevent the connector 300 from disconnecting from the adaptor 200.

The connector 300 typically is engaged in an adapter 200, or the like with at least one interior latch 260 within the adapter, the interior latch 260 disposed on one or more sides of an interior surface of the adapter 200. The at least one interior latch 260 engages connector 300 by entering and/or snapping into the through opening 318 and holding the connector 300 in place. The connector 300 may not be easily dislodged from the adapter 200 by pulling the connector 300 out of the adaptor 200 due to the flat portion 360.

In exemplary embodiments, an optical fiber connector 300 may comprise one or more release members 370 adapted to release the connector 300 from connection with an adapter when being held in place by latches, or the like. In exemplary embodiments, a tool may be provided to engage the release members 370 and push the release members 370 forward, thereby releasing the optical fiber connector from the adaptor, or the like. A connector 300 in accordance with embodiments of the present disclosure may comprise a flat portion 360. The flat portion 360 may maintain the housing in place and may not push latches inside an adaptor back so that the connector 300 can be removed when pulled back. As such, a connector 300 in accordance with embodiments of the present disclosure may be locked into place within an adaptor or the like and may resist becoming dislodged when pulled away from the adaptor or the like.

In accordance with exemplary embodiments of the present disclosure, one or more release members 370 may be on an exterior surface of the outer housing 310 and may be slidably attached to one or more sides of the outer housing 310. A release member 370 may comprise prongs 374 with release mechanisms 376 at the ends of the prongs 374 so that when the release member 370 is pushed forward or toward an adapter (for example, 200 shown in FIG. 2), the release mechanisms 374 are pushed forward, thereby displacing or putting pressure on latches (for example, 260 shown in FIG. 2) interior or within an adaptor (for example, 200 shown in FIG. 2) when the connector 300 is engaged in the adaptor, or the like. In operation, the connector 300 may be latched into the adaptor, or the like, and may be secured within the adaptor, or the like.

In exemplary embodiments, if a user desires to disengage the connector 300 from the adaptor, or the like, two release members 370, one on each side of the housing 310, may be pushed forward using a removal tool, or the like, thereby disengaging interior latches attached to the interior of the adaptor, or the like, on both sides of the housing. To ensure the release members are pushed forward together simultaneously, a release tool may be used that engages all release members 370 simultaneously. A connector 300 in accordance with exemplary embodiments of the present invention effectively removes the slope or angled portion from a typical housing and instead includes a flat portion 360 and a pair of opposing release members 370 connected to the housing 310 that must be engaged substantially simultaneously to release the connector 300 from an adaptor, or the like. As such, many unintentional disconnections may be prevented by requiring the use of a tool to actuate the release members 370 and disengage the connector 300 from an adaptor, or the like.

In exemplary embodiments, a connector 300 may be provided. The connector 300 may comprise one or more release members slidably attached to an outer housing 310. A release member may be disposed within one or more lateral guides 373 and/or stabilizer couplers 363 formed to guide the release member 370 and allow it to slide back and forth along a plane defined by one or more sides of the outer housing 310. The lateral guides 373 may be adapted to allow the release member 370 to slide forward and backward in a direction parallel with a side of the outer housing 310 at a predetermined distance. As shown in the example in FIG. 3, the release member 370 may comprise a fork shape comprising one or more prongs 374 attached to a base 371.

In exemplary embodiments, the one or more prongs 374 may comprise a release mechanism 376. A release mechanism 376 may generally comprise any structure adapted to release a connector 300 from a latch, or the like. The release mechanism 376 may comprise a slope, a bump, an angled portion, a curved portion, a round portion, a square portion, a triangular portion, a jagged portion, a toothed portion, a waved portion, or any shape adapted to release the connector 300 from a latch, or the like. In some embodiments, the release mechanism 376 may be formed to push a latch, or the like, away from the connector 300, thereby releasing the connector 300 from an adaptor, or the like. The release mechanism 376 may be any length, size or shape, provided it is suitable for embodiments of the present invention. The release mechanism 376 may be made of any polymer, metal or other substantially rigid material, suitable for embodiments of the present invention. The release member 370 may comprise two release mechanisms 376, however such number is generally dictated by the number of prongs 374 as each prong 374 may comprise a release mechanism 376 or the like. In some embodiments, the release member 370 may not comprise a prong 374, but may still comprise a release mechanism 376.

In exemplary embodiments, a release member 376 may comprise a slope, wherein the slope begins sloping upward from an outermost tip of the prong and rises and plateaus at a top portion of each prong 374. The connector 300 may comprise a latch rest 378 adapted to allow the prongs 374 to slidably move within the latch rest 378. The latch rests 378 may be disposed on opposing lateral sides of the through opening 318 and be aligned with the prongs 374 so that the prongs 374 may slide on top of the prongs slots 378 when pushed forward by a removal tool, ore the like. In some embodiments, the release member 370 may comprise a ejection member 372 positioned at an end of the release member 370 opposite from the release mechanisms 376.

In some embodiments, the ejection member 372 may be formed such that a removal tool may latch on or otherwise couple with the ejection member 372 and push the release member 370 forward to remove the connector 300 from an adaptor 200, or the like. In some embodiments, the ejection member 372 may comprise a hole, a slot, a projection, a bump, a guide, or any structure or opening adapted to couple with a removal tool, or the like. In some embodiments, the connector 300 may not comprise an ejection member 372. The release projection 372 may be positioned on each release member 370 and may extend outwardly away from a center of the outer housing 310 or be a hole or slot within the release member 370 when the release member 370 is attached to the outer housing 310. In some embodiments, the outer housing 310 may also comprise a housing projection 362 formed to allow a removal tool to couple with or otherwise grab the housing projection 362 to pull the entire connector out of the adaptor 200. The housing projection 362 may be disposed on an end of the housing 310 opposite the outer opening 316 or in any position that would allow a removal tool to grab the housing projection 362 and pull it away from an adaptor 200 or the like. The housing projection 362 may comprise any shape adapted to be pulled by or coupled with a removal tool, or the like. The housing projection 362 may extend outwardly from the outer housing 310 away from the center of the outer housing 310.

In exemplary embodiments, when the connector 300 is inserted into an adaptor 200, the interior latch 260 may be snap into the through opening over the latch rests 378. The flat portion 360 of the connector 300 may be disposed on opposing lateral sides of the through opening adjacent to each of the prongs 374. As such, when the connector 300 is attached to an adaptor 200, or the like, the interior latch 260 may be disposed generally adjacent the flat portions 360 such that pulling on the connector 300 in a direction away from the adaptor 200 will cause straight portions 360 to contact the interior latches and prevent the connector 300 from detaching from the adaptor 200. In exemplary embodiments, the straight portions 360 may comprise any shape adapted to maintain a connection between the connector 300 and the latch, and to resist releasing the connector 300 from the latch. To release the connector 300 from the adaptor, the release members 370 may be slid toward the flat portions 360 such that the interior latches 260 may be pushed back such that the flat portions 360 may slide past the interior latches 260 and the connector 300 may be removed from the adaptor 200, or the like.

Figure 4:
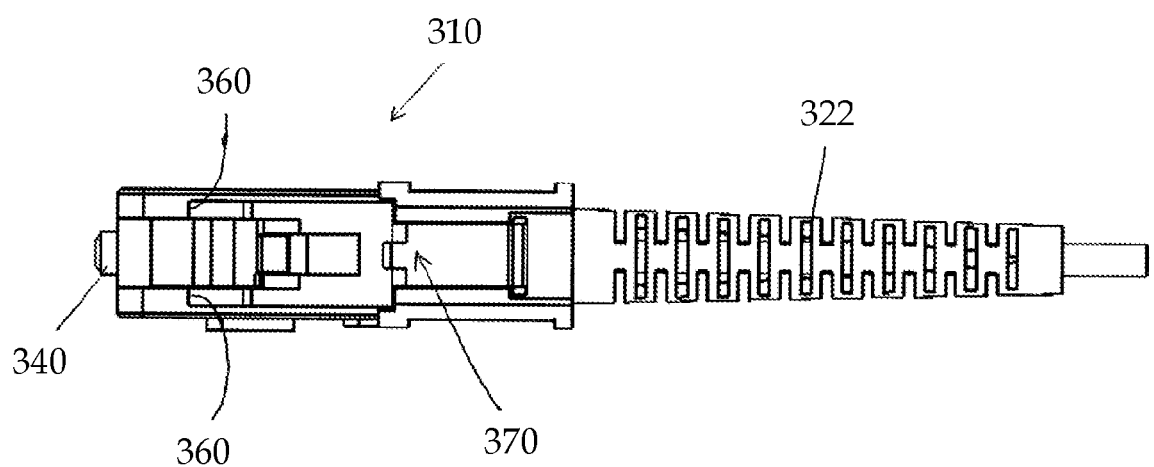
FIG. 4 depicts a side view of an optical fiber connector in accordance with exemplary embodiments of the present disclosure.

Referring now to FIG. 4, a side view of an optical fiber connector 300 in accordance with exemplary embodiments of the present disclosure is depicted. FIG. 3 shows that the flat portion 360 is coincident with a plane running parallel to a side of the outer housing 310. Although the connector 300 is generally depicted in a generally rectangular shape, with a square cross-section, other shapes are contemplated. The shape of the connector 300 is generally formed to fit within an adaptor, or the like. The release member 370 may be slide along the side of the outer housing 310 toward the flat portions 360 and the ferrule 340 and away from the extended fiber cable 322 so that the prongs of the release member 370 may release the connector 300 from an adaptor, or the like. When coupled with an adaptor, the ferrule 340 may be properly aligned by the connector 300 and seated within an adaptor such that an approximately 1 newton force may exist at the interface between the ferrule 340 and a second opposing cable, or the like.

Figure 5:
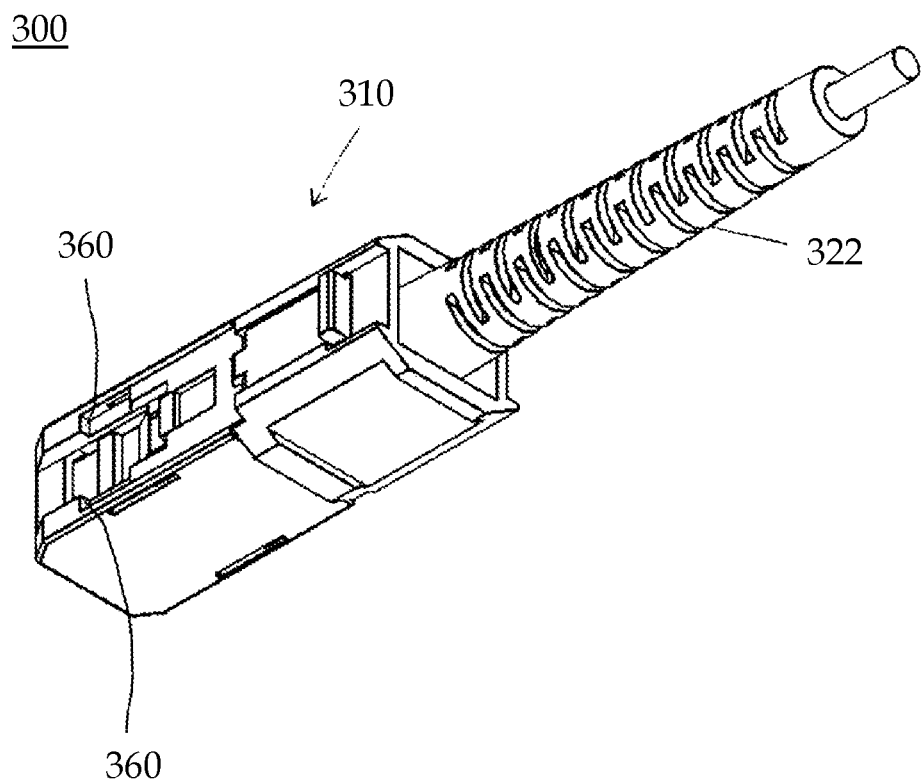
FIG. 5 depicts a bottom perspective view of an optical fiber connector in accordance with exemplary embodiments of the present disclosure.

Referring now to FIG. 5, a bottom perspective view of an optical fiber connector 300 in accordance with exemplary embodiments of the present disclosure is depicted. FIG. 5 depicts the flat portions 360 and illustrates that the flat portions 360 may be disposed at an angle perpendicular to a side of the outer housing 310 and disposed on both the top and bottom of the outer housing 310. The fiber cable 322 may be disposed within the outer housing 310 and may extend through the rear of the outer housing 310 to the front side. When the connector 300 is coupled with an adaptor, the interior latches are positioned behind the flat portions 360 such that the flat portions substantially prevent a user from pulling the connector 300 out of the housing in the direction of the fiber cable 322 extending from the housing.

Figure 6:
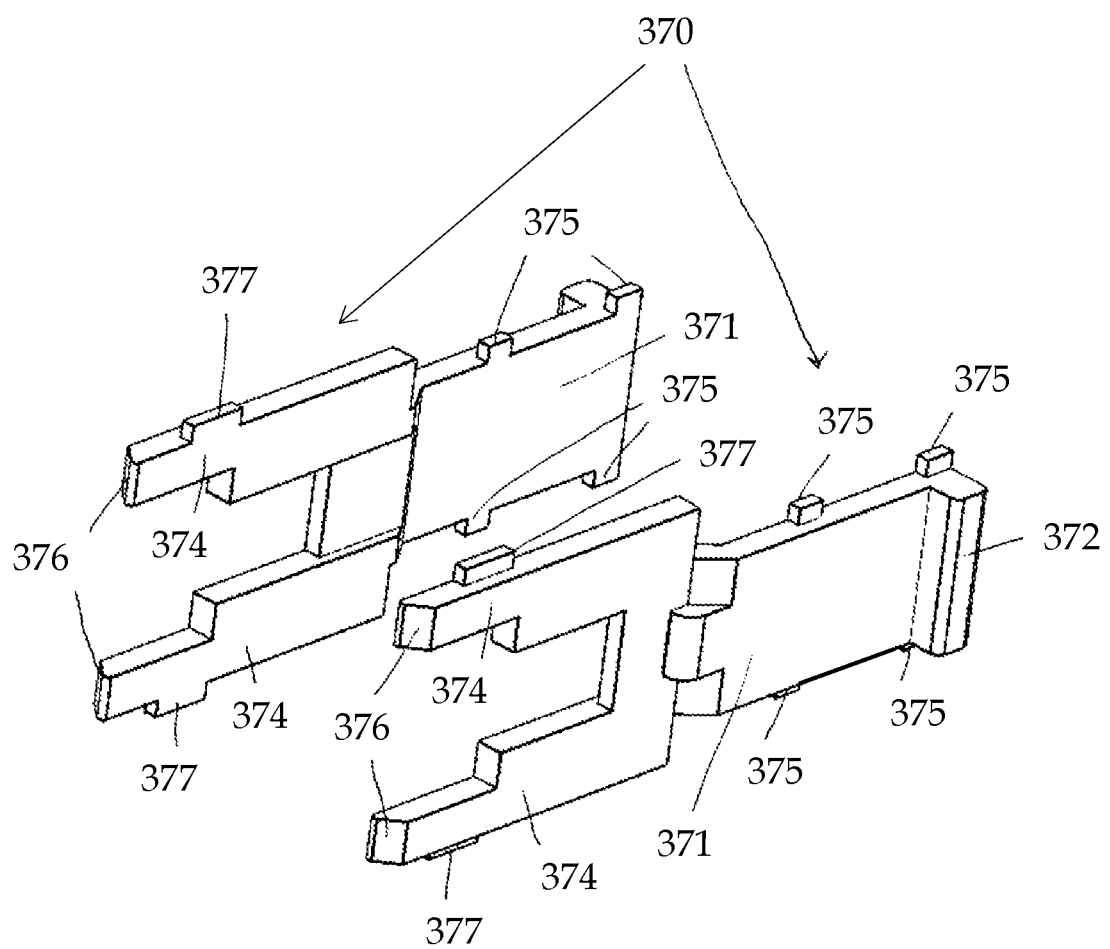
FIG. 6 depicts an elevated perspective view of a pair of release members in accordance with exemplary embodiments of the present disclosure.

Referring now to FIG. 6, an elevated perspective view of a pair of release members 370 in accordance with exemplary embodiments of the present disclosure is depicted. A release member 370 may comprise a base 371 attached to one or more prongs 374 having release mechanisms 376 sloping toward the outermost edge of the prongs 374. The base 371 may comprise a ejection member 372 formed to couple with, or be grasped by, a tool to be slidably moved along the side of a connector, or the like. The base may also comprise one or more base projections 375. The base projections 375 may be adapted to operate with the lateral guides 373 of the connector 300. The base projections 375 may extend away from a center of the base 371 and be positioned on opposing sides of the base 371. In the example pictured in FIG. 6, four base projections 375 are depicted and spaced apart to allow the base to be guided along the side of the housing 310.

In exemplary embodiments, the base projections 375 restrict movement away from the housing 310 when disposed within the lateral guides 373 or the like, while allowing the release member 370 to slide forward and backward within the lateral guide 373. The prongs 372 may comprise one or more stabilizers 377 formed to couple with or operate with the stabilizer couplers 363 of the outer housing 310. In some embodiments, the stabilizer couplers 363 may be adapted to couple with the stabilizer 377 and may comprise a projection, a hole, a slot, a channel, and/or the like. The stabilizers 377 may be adapted to couple with the stabilizer couplers 363 and may comprise a prong projection, a hole, a slot, a channel, and/or the like. The stabilizers 377 may extend from the pongs 374 and align with the stabilizer couplers 363 of the housing. When the stabilizers 377 are disposed within the stabilizer couplers 363, the release member 370 may be guided such that the release member 370 may slide back and forth along a side of the outer housing 310 but not rock or move laterally away from the housing 310. A pair of release members 370 may generally be disposed on either side of the housing and may be formed to release an interior latch inside an adaptor, or the like.

Figure 7:
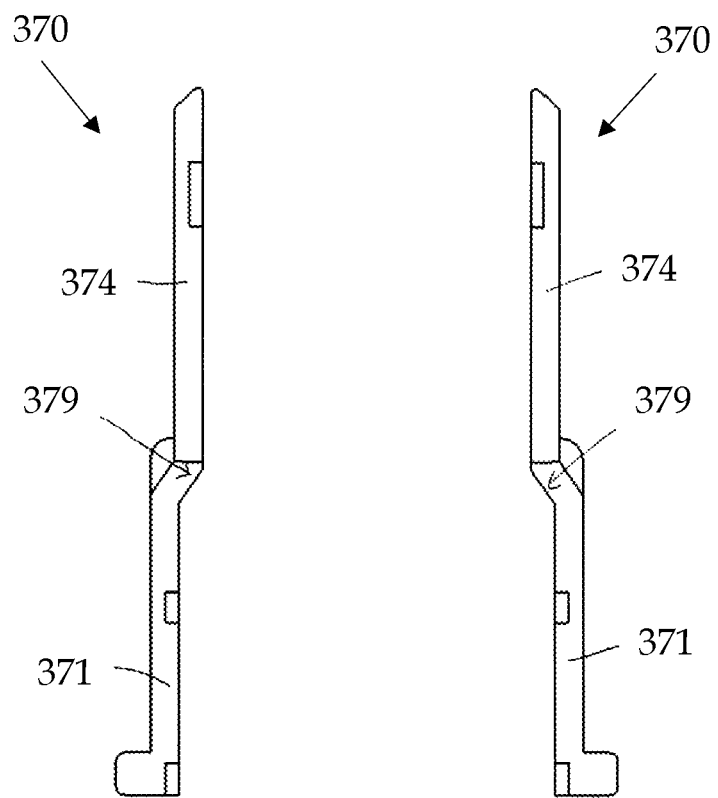
FIG. 7 depicts a top view of pair of release members in accordance with exemplary embodiments of the present disclosure.

Referring now to FIG. 7, a top view of pair of release members 370 in accordance with exemplary embodiments of the present disclosure is depicted. The release members 370 may comprise a base 371 attached to one or more prongs 374. in some embodiments, the prongs 374 may be positioned offset from the base 371 such that when the release members 370 are coupled with the outer housing 310, the prongs 374 are closer to the center of the outer housing 310 than the base 371. In some embodiments, the prongs 374 may be joined to the base 371 at an offset portion 379. The offset portion 379 may be angled inward toward the center of the outer housing 310 when the release member 370 is attached to the outer housing 310. The offset portion 379 may be adapted to allow the prongs to be positioned within the through opening 318 of the outer housing 310, or the like, so that the prongs 374 may slide substantially along the surface of the latch rests 378.

Figure 8:
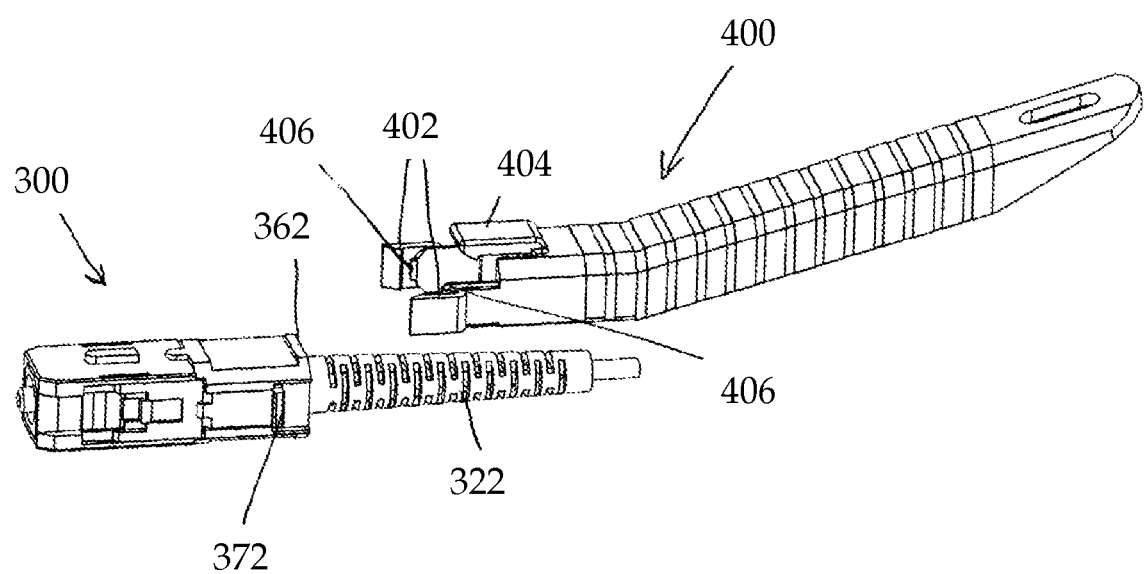
FIG. 8 depicts an elevated perspective view of an optical fiber connector and a removal tool in accordance with exemplary embodiments of the present disclosure.

Referring now to FIG. 8, an elevated perspective view of an optical fiber connector 300 and a removal tool 400 in accordance with exemplary embodiments of the present disclosure is depicted. In some embodiments, a removal tool 400 may comprise a handle 401, one or more lateral prongs 402, and an upper prong 402. The lateral prongs 402 may comprise a pushing element 406, or the like. It is appreciated that while the example removal tool 400 depicted comprises lateral prongs 402 positioned opposite one another and an upper prong 404 positioned at the end of the removal tool 400 opposite the handle the prongs may be disposed in positions that correspond to the ejection members 372 and/or housing projection 362 of the connector 300. In some embodiments, the handle 401 may extend in a straight line back from the lateral prongs 402 and upper prong 404.

In some embodiments, like the example pictured in FIG. 8, the handle 401 may be slightly angled to allow for ease of grip and removal of the connector 300. The lateral prongs 402 may be adapted to couple with the ejection members 372 such that the removal tool 400 is secured to the ejection members 372 and the pushing elements 406 are positioned behind the ejection member 372. The removal tool 400 may comprise one or more pushing elements 406 adapted to be positioned behind the ejection members 372 and push the release member 370 forward to release the connector 300. The upper prong 404 may be adapted to couple with the housing projection 362 such that the upper prong 404 may snap over the housing projection 362 and pull the entire connector 300 away front of the adaptor, or the like, when the upper prong 404 is coupled with the housing projection 362.

In some embodiments, the upper prong 404 may be positioned such that a connection point between the upper prong and the housing projection 362 is behind the connection point of the lateral prongs 402 and the ejection members 372. As such, when the removal tool 400 is placed on the connector 300 a connection between the lateral prongs 402 and the ejection members 372 is made first, and the connection between the upper prong 404 and the housing projection 362 is not made until after the pushing element 406 pushes the release member 370 forward and releases the connection between the connector 300 and the adaptor, or the like. After the release member 370 releases the connection between the connector 300 and the adaptor, or the like, the upper prong 404 may snap and latch onto the housing projection so that the connector 300 may be pulled out of the adaptor, or the like, by use of the handle 401.

Figure 9:
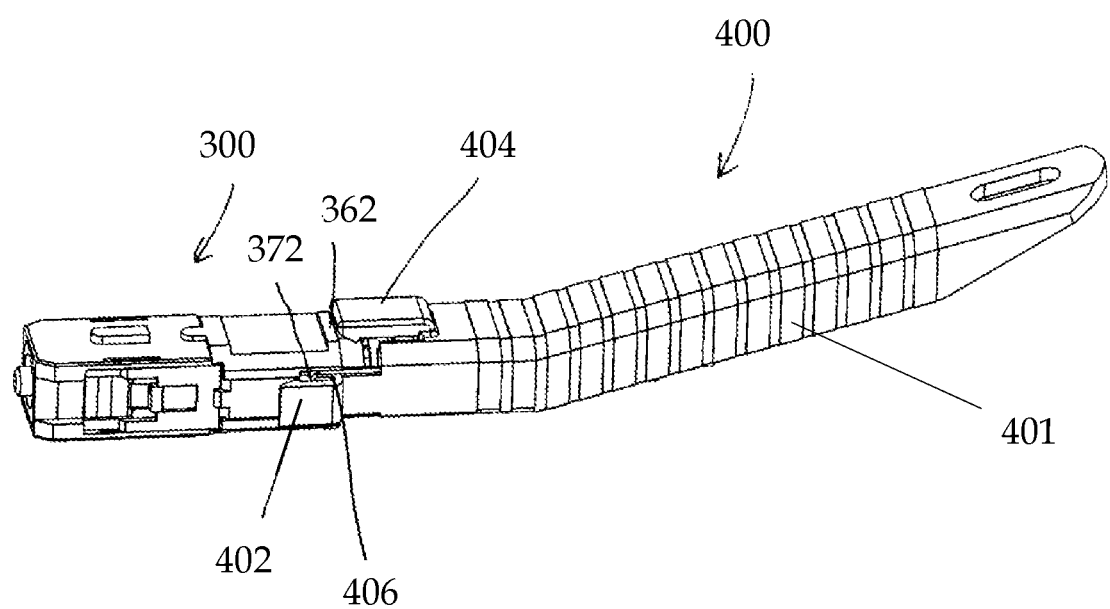
FIG. 9 depicts an elevated perspective view of an optical fiber connector and a removal tool in accordance with exemplary embodiments of the present disclosure.

Referring now to FIG. 9, an elevated perspective view of an optical fiber connector 300 and a removal tool 400 in accordance with exemplary embodiments of the present disclosure is depicted. FIG. 9 depicts a connection between the lateral prongs 402 and the ejection member 372 before the upper prong 404 has attached to the housing projection 362. If a user wished to remove the connector 300 depicted in FIG. 4 form an adaptor, or the like, the user would push the removal tool toward the connector 300 so that the release members would be pushed forward by the pushing element 406. When a pushing force is applied to the removal tool 400, the pushing element 406 may push the release members forward toward the connection point of the connector 300 and an adaptor, or the like.

In exemplary embodiments, when the release members are pushed forward with a pushing element 406 the release members will disconnect the connector 300 from the adaptor, or the like. As the release members are pushed forward the upper prong will couple with the housing projection. After the connector 300 is disconnected from the adaptor with the release member, the user may pull the handle of the removal tool 401 away from the adaptor and the upper prong 404 will work to pull the connector 300 out of the adaptor, or the like, via the housing projection 362, or the like. The connector 300 may generally comprise plastic and metal but the use of other suitable materials is contemplated by and within embodiments of the present disclosure.

Figure 10:
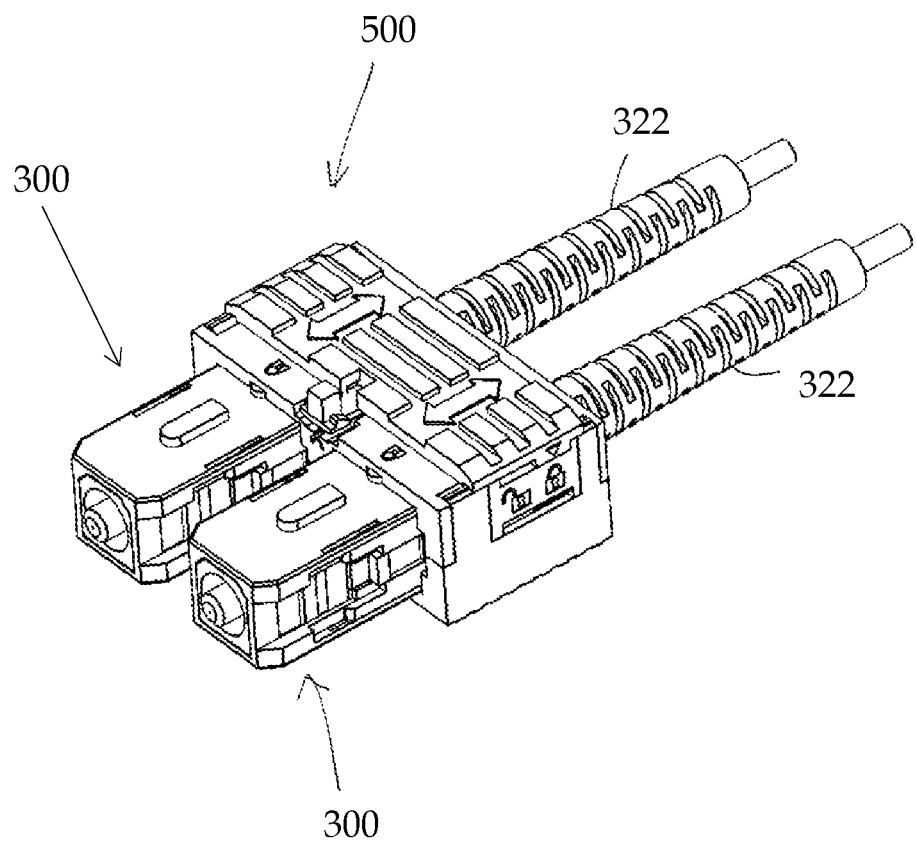
FIG. 10 depicts an elevated perspective view of a duplex optical fiber connector in accordance with exemplary embodiments of the present disclosure.
Figure 11:
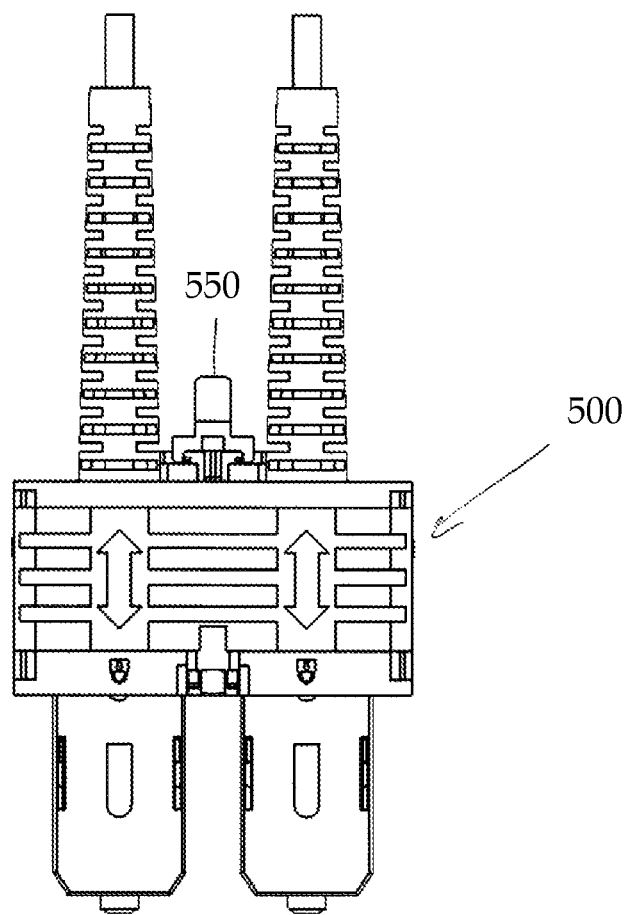
FIG. 11 depicts a top view of a duplex optical fiber connector in accordance with exemplary embodiments of the present disclosure.

Referring now to FIGS. 10 and 11, views of a duplex optical fiber connector 500 in accordance with exemplary embodiments of the present disclosure are depicted. In some embodiments, a duplex connector 500 may be adapted to connect two connectors 300 and fiber cables 322 to an adaptor, or the like. In exemplary embodiments, the two connectors 300 may comprise four release members, or the like. To remove the two connectors 300 from an adaptor, or the like, the four release members must be pushed forward to release all connections with the adaptor simultaneously, otherwise the connector 300 may not be removable from the adaptor, or the like. The duplex connector 500 may be adapted to allow all four release members to be pushed forward substantially simultaneously. To prevent the duplex connector 500 from pushing forward all four release members 370 after accidental or unintentional forces are applied on the duplex connector 500, an additional connector lock 550 may be provided. A connector lock 550 may be inserted in to the back of the duplex housing 550 to prevent the release members from being pushed forward and releasing the connectors 300 from an adaptor. In some embodiments, a key may be required to unlock the lock and enable the housing to be disengaged from the adaptor and/or the like. In some embodiments, a keyless lock may be included.

Figure 12:
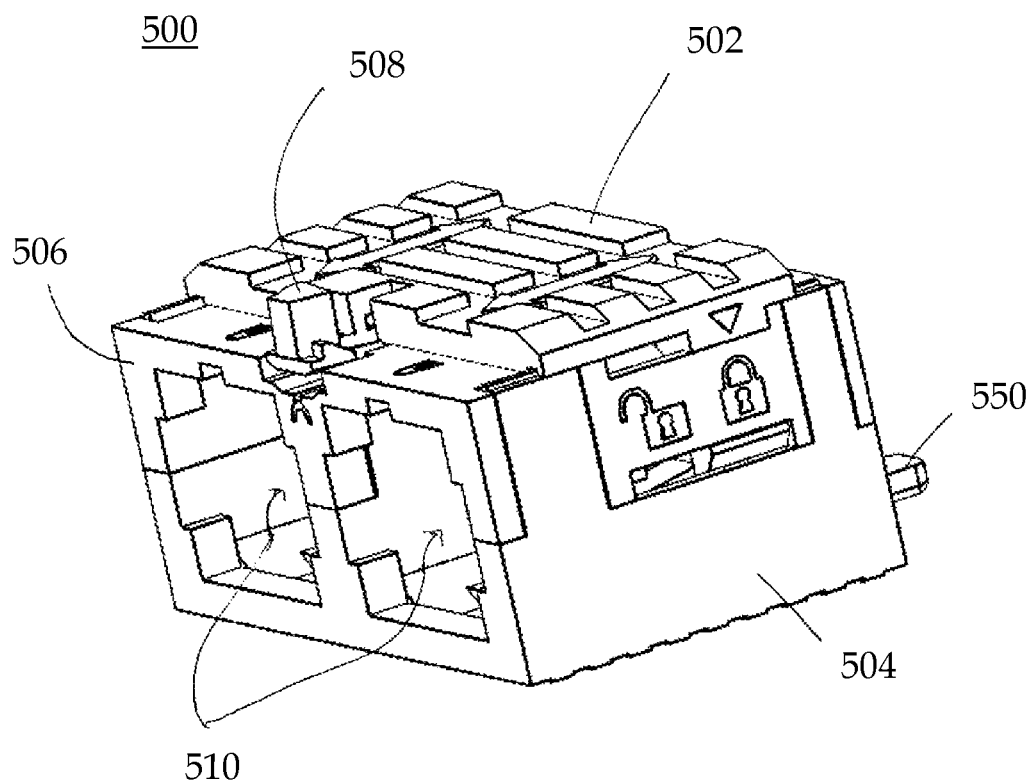
FIG. 12 depicts an elevated perspective view of a duplex optical fiber connector in accordance with exemplary embodiments of the present disclosure.
Figure 13:
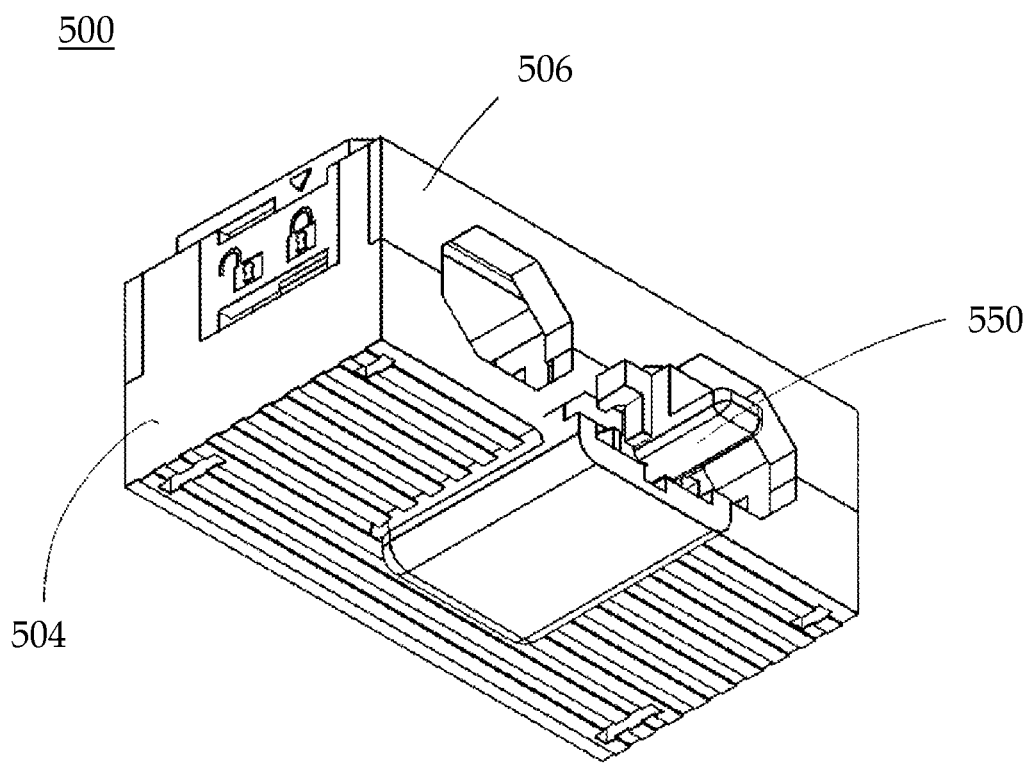
FIG. 13 depicts a bottom perspective view of a duplex optical fiber connector in accordance with exemplary embodiments of the present disclosure.

Referring now to FIGS. 12 and 13 perspective views of a duplex optical fiber connector 500 in accordance with exemplary embodiments of the present disclosure are depicted. A duplex connector 500 may comprise a slide 502, a lower housing 504, an upper housing 506, an upper slide lock 508, a connector opening 510, a connector lock 550, or the like. The upper housing 506 and lower housing 504 may join together to form a substantially rectangular structure with a rectangular cross-section. In some embodiments, the slide 502 may be adapted to slide back and forth over a top portion of the upper housing 506 and be coupled with the release members 370 of the connectors 300, such that when the slide 502 is moved forward the release members 370 are also moved forward.

In some embodiments, the slide 502 may be adapted to push all release members 370 forward substantially simultaneously to release all connectors 300 from an adaptor, or the like. The upper housing 506 and lower housing 504 may be adapted to couple together and house the connectors 300, within the connector openings 510, or the like. Each of the connector openings 510 may be sized to fit and secure the outer housing 310 of a connector 300. The connector lock 550 may be adapted to prevent the slide 502 from moving forward toward the interface and pushing the corresponding release members forward to release the connectors from the adaptor, or the like. In effect, the lock prevents the connectors from becoming disengaged unintentionally by pushing forward on the slide 502, or the like.

In some embodiments, the duplex connector 500 may comprise an upper slide lock 508 adapted to engage the slide 502 and prevent the slide 502 from sliding back to an original location after it has been slid forward to engage the slide lock 508. When the slide 502 is locked into position with the slide lock 508, the connected release members 370 may also be locked in a position where the duplex connector 500 is removable from an adaptor, or the like, by pulling duplex connector 500 away from the adaptor, or the like. When the duplex connector 500 is removed, the attached simplex connectors 300 are also removed from the adaptor, or the like.

Figure 14:
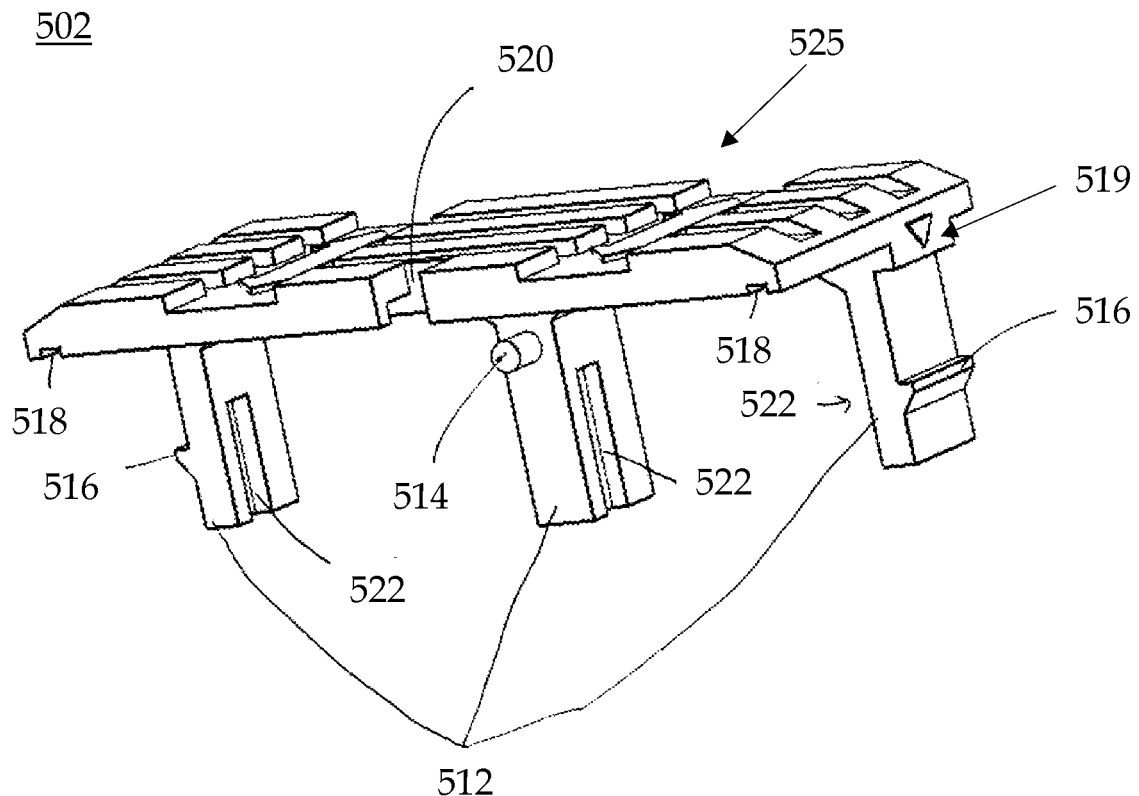
FIG. 14 depicts an elevated perspective view of slide for a duplex optical fiber connector in accordance with exemplary embodiments of the present disclosure.
Figure 15:
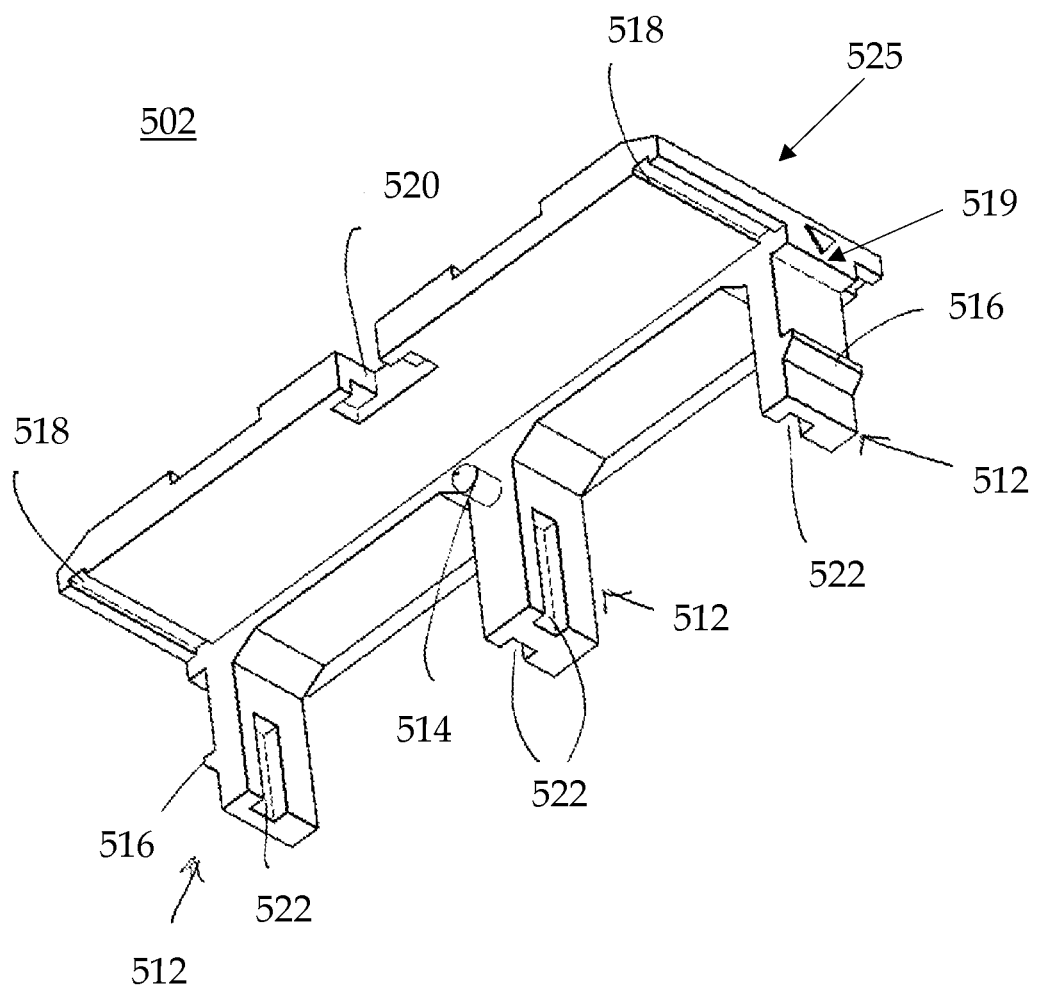
FIG. 15 depicts a bottom perspective view of a slider for a duplex optical fiber connector in accordance with exemplary embodiments of the present disclosure.

Referring now to FIGS. 14 and 15, perspective views of slide 502 for a duplex optical fiber connector 500 in accordance with exemplary embodiments of the present disclosure are depicted. A slide 502 may comprise one or more slide arms 512, a top platform 525, a slide spring mount 514, one or more outer guides 516, one or more lateral notches 518, a lower projection 519, a lock receiving opening 520, and a projection notch 522. In some embodiments a top platform 502 may be substantially rectangular and may be attached to one or more slide arms 512. In the example depicted in the figures, three slide arms 512 are shown, however more or fewer slide arms 512 are contemplated by and within embodiments of the present disclosure.

In some embodiments, the slide 502 may comprise three slide arms 512 attached to a top platform 525, with two of the slide arms 512 positioned on opposing lateral ends of the top platform 325 and a third positioned in the center of the top platform 525. The slide arms 512 may generally extend perpendicularly from a lower surface of the top platform 525 and may comprise a generally rectangular shape with a rectangular cross section, or the like. The slide arms 512 may couple with and guide release members 370 of simplex connectors 300 positioned within the duplex connector 500, or the like. The slide arms 512 may comprise projection notches 522 for receiving the ejection member 372 or the like of a release member 370, such that the movement of the slide 502 causes movement of the release member 370.

In some embodiments, the slide arms 512 may comprise a number of projection notches 522 equal to the number of ejection members 372 the connectors 300 have. By way of example, if two connectors 300 are to be positioned between and coupled with the slide arms 512 and the two connectors 300 comprise four release members 370 and ejection members 372, the slide arms 512 may comprise four corresponding projection notches 522 to receive the four ejection members 372. In some embodiments, a slide arm 512 may comprise a slide spring mount 514 for accepting a spring. The slide spring mount 514 may generally be disposed on, and extend perpendicularly from, a slide arm 512 disposed under the center of the top platform 525 and may comprise a generally cylindrical shape for accepting a spring. A spring may be included on a slide spring mount 514 to bias the slide in a certain position (forward or reverse), generally toward the rear portion of the duplex coupler 500 away from the interface. A slide arm 512 disposed under the center of the top platform 525 may act as a center guide to guide the slide 502 between two housings 310, or the like. In some embodiments, the center guide may prevent the slide 502 from moving laterally, rocking, or the like.

In some embodiments, slide arms 512 positioned under the outer lateral portions of the top platform 525 may comprise outer guides 516 for coupling with a portion of the duplex connector 500 and substantially preventing the slide 502 from moving vertically away from a plane defined by a top surface of the upper housing 506. The outer guides 516 may also be formed to guide the slide 502 in a path while connected to the upper housing 506 and lower housing 506. In some embodiments, the outer guides may extend outwardly from an outer side of the slide arms 512 and may be disposed on the lower half of the slide arms 512.

In exemplary embodiments of the present disclosure, a top platform 525 may comprise lateral notches 518, a lower projection 519, a lock receiving opening 520 and an upper surface adapted to allow a user to easily push the slide 502 forward and grip the duplex connector 500. For example, the upper surface may comprise notches to allow for better gripping of the slide 502. In some embodiments, lateral notches 518 may be disposed under the top platform 525 and may be adapted to couple with a portion of the lower housing 504 and or upper housing 506 and guide the slide 502 along a path while restricting lateral movement of the slide 502. The lock receiving opening 520 may generally comprise an opening adapted to couple with the upper slide lock 508 described above. In some embodiments, a lower projection 519 may comprise a generally rectangular shape and may extend below the top platform 525 and outwardly from a top portion of a slide arm 512. A lower projection 519 may be adapted to guide the slide 502 along a path, or the like, while disposed within a portion of the upper housing 506.

Figure 16:
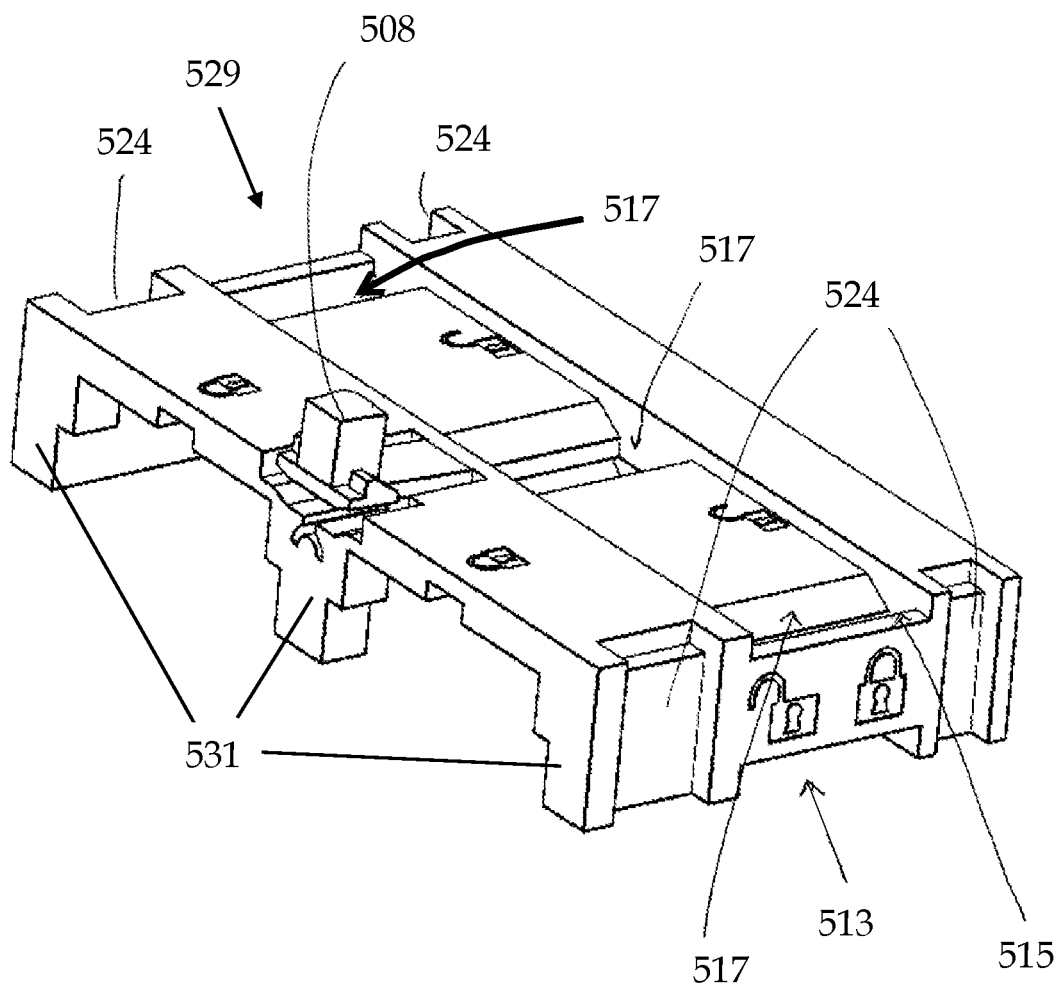
FIG. 16 depicts an elevated perspective view of an upper housing for a duplex optical fiber connector in accordance with exemplary embodiments of the present disclosure.
Figure 17:
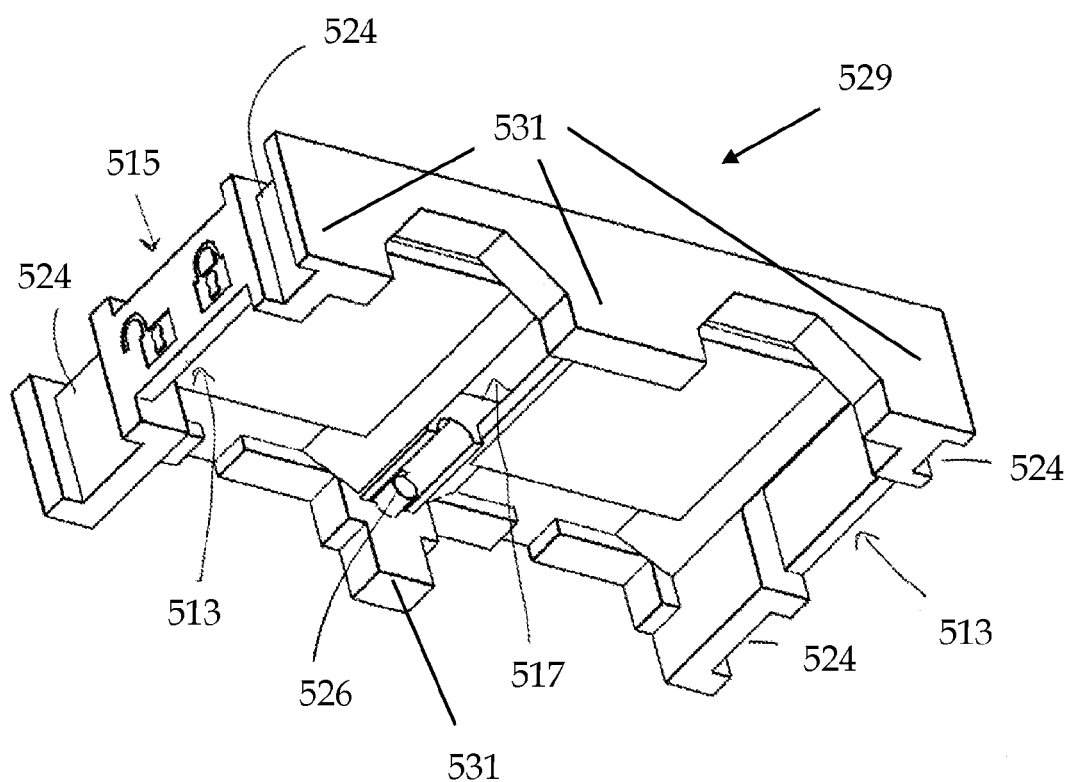
FIG. 17 depicts a bottom perspective view of an upper housing for a duplex optical fiber connector in accordance with exemplary embodiments of the present disclosure.

Referring now to FIGS. 16 and 17, perspective views of an upper housing 506 for a duplex optical fiber connector 300 in accordance with exemplary embodiments of the present disclosure is depicted. In exemplary embodiments, an upper housing 506 may be adapted to couple with a slide 502 and a lower housing 504 to form a duplex connector 500. The upper housing 506 may comprise a upper platform 529, an upper slide lock 508, an outer guide opening 513, a lower projection guide 515, one or more slide arm openings 517, one or more coupler openings 524, a housing spring mount 526, one or more lower protrusions 531, and/or the like. The upper housing 506 may generally be adapted couple with a lower housing 504 to house connectors, or the like. The upper housing may comprise an upper platform and lower protrusions 531 extending underneath the upper platform 529. The lower protrusions 531 may be adapted to couple with portions of a lower housing 504 and may be disposed at various intervals under the upper platform 529. In the example depicted the lower protrusions 531 extend under the outer lateral edges of the platform 529 and also extend form under the center of the platform 529 to form the upper portion of the connector opening 510 and also couple with the lower housing 504.

The upper housing 506 may comprise outer guide openings 513 for accepting the outer guide 516 of the slide 502, and/or the like. The outer guide openings 513 may be adapted to secure the outer guide 516 and guide the slide 502 along a path while preventing the slide 502 from moving vertically away from a plane formed by a top surface of the upper housing 506. The outer guide openings 513 may be formed in a size to accept the outer guides 516 and allow the outer guides 516 to move back and forth without moving vertically. The outer guide openings 513 may be positioned in the center of a lower protrusion 531 extending under the upper platform 529 along a lateral edge of the upper platform 529. The upper housing 506 may also comprise a lower projection guide 515 for accepting the lower projection 519 of the slide 502, or the like. The lower projection guide 515 may be formed to accept the lower projection 519 and may allow the lower projection 519 to slide back and forth within the confines of the edges of the lower projection guide 515. The lower projection guide 515 may limit the extent to which the slide 502 moves forward and backward along a top surface of the upper housing 506, or the like. The upper housing 506 may comprise a generally rectangular shape.

The upper housing 506 may comprise slide openings 517 for accepting the slide arms 512 of the slide 502, or the like. The slide openings 517 may allow the slide arms 512 to pass through the upper housing 506, and may guide the slide arms 512 so that they may slide back and forth but not laterally. The slide openings 517 may also limit the extent at which the slide arms 512 may move back and forth. The number of slide openings 517 may be equal to the number of slide arms 512. In the example depicted in FIGS. 17 and 18, the upper housing comprises 3 slide openings. Additional or fewer slide openings 517 are contemplated by and within embodiments of the present disclosure.

In exemplary embodiments, slide openings 517 may be generally disposed on the outer lateral portions of the upper housing 506 and/or a center portion of the upper housing 506. Slide openings 517 may be generally rectangular in shape and/or may be generally formed in the shape of the slide arms 512 to accept the side arms 512. The upper housing 506 may slope inwardly from a top surface of the upper platform 529 to the edges of the slide openings to guide the slide arms 512 into the slide arm openings 517 during assembly.

The upper housing 506 may comprise coupler openings 524 for receiving a coupler of the lower housing 504 and coupling with the lower housing 504. The coupler openings 524 may be disposed on lateral sides of the upper housing 506 may comprise notches formed on a front portion and a back portion of each of the lateral sides of the upper housing 506. The coupler openings 524 may be formed in a shape for accepting couplers of the lower housing 504 and may comprise the same number as the number of couplers present in the lower housing. The coupler openings 524 may be adapted to allow couplers of the lower housing 504 to snap into or otherwise attach to the openings such that the upper housing 506 and lower housing 504 are coupled together.

In some embodiments, the upper housing 506 may comprise a housing spring mount 526 for accepting a spring. The spring may be mounted on the housing spring mount 526 and a slide spring mount 514 on an opposing end (see FIG. 17). The spring may extend between the housing spring mount 526 and the slide spring mount 514 and may bias the slide 502 toward a rear portion of the duplex connector 500 away from the interface. When the slide 502 is in a locked position and the upper slide lock 508 is engaged with the lock receiving opening 520, releasing the upper slide lock 508 may allow the tension in the spring to move the slide 502 to the rear portion of the duplex connector 500. The housing spring mount 526 may extend inwardly toward the center of the upper housing 506 perpendicularly from a lower protrusion 531 extending downwardly from the top platform 525, or the like.

The housing spring mount 526 may comprise a generally cylindrical shape for accepting a spring, or the like. The upper housing 506 may comprise an upper slide lock 508 connected via a hinge portion that is pliable. When the slide 502 is moved forward, a portion of the slide lock 508 may engage the lock receiving opening 520 and lock the slide 502 in a forward position away from the rear portion of the slide 502. To release the slide 502 from the upper slide lock 508, the upper slide lock 508 may be pressed downwardly toward the lower housing 504, whereby the upper slide lock 508 will rotate downwardly about the hinge and the lock receiving opening 520 will be disengaged from protrusions on the lateral sides of the upper slide lock, thereby releasing the slide 502 and allowing the spring to move the slide 502 to a rear portion of the duplex connector 500, or the like.

Figure 18:
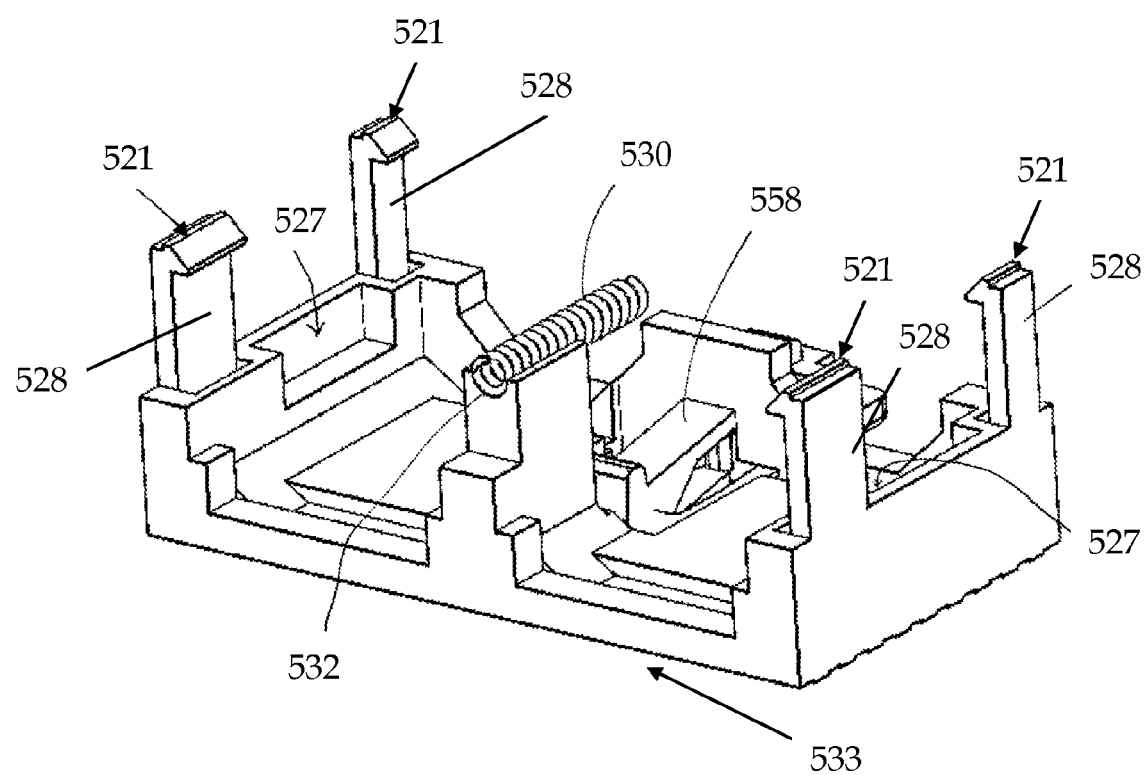
FIG. 18 depicts an elevated front perspective view of a lower housing for a duplex optical fiber connector in accordance with exemplary embodiments of the present disclosure.
Figure 19:
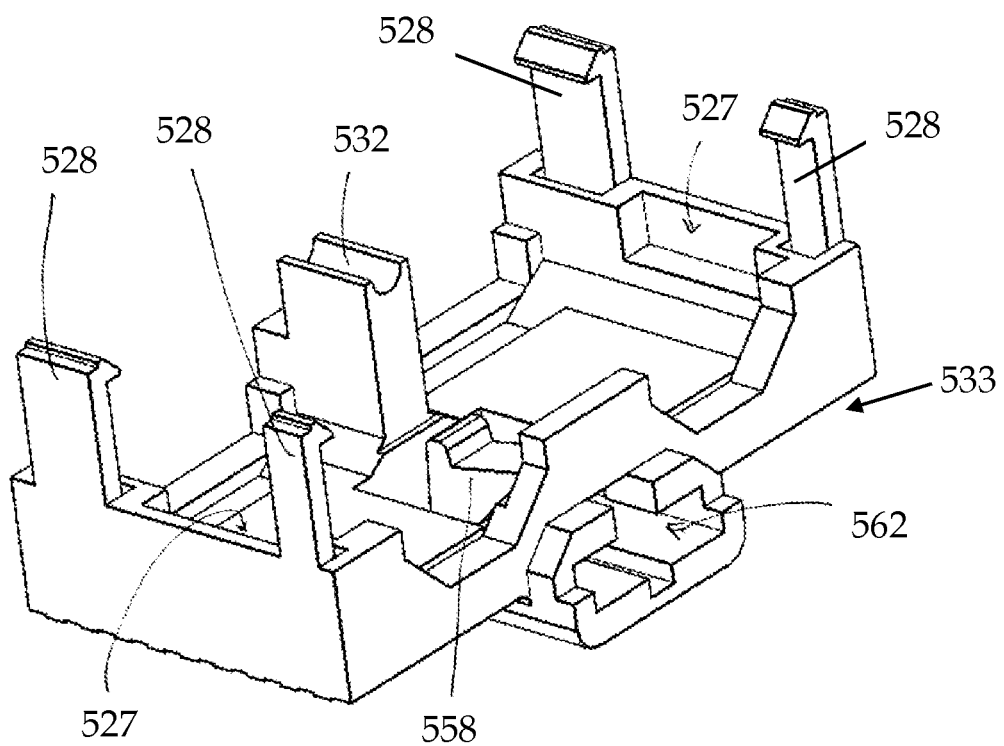
FIG. 19 depicts an elevated back perspective view of a lower housing for a duplex optical fiber connector in accordance with exemplary embodiments of the present disclosure.

Referring now to FIGS. 18 and 19, perspective views of a lower housing 504 for a duplex optical fiber connector 500 in accordance with exemplary embodiments of the present disclosure is depicted. A lower housing 504 may generally be adapted to couple with an upper housing 506 as described above to accept and support one or more connectors 300, or the like. A lower housing 504 may comprise one or more slide arm guides 527, couplers 528, lateral notch guides 521, a spring support 532, a lower slide lock 558, and/or a connector lock opening 562, or the like. A lower housing 504 may comprise a lower platform 533 having a generally rectangular shape and couplers 528 extending upwardly from the lower platform. A coupler 528 may be adapted to couple with the coupler openings 524 of the upper housing 506, or the like, thereby joining together and coupling the upper housing 206 and the lower housing 204 and forming a complete connector opening 510 for receiving a connector. The couplers 528 may be disposed on four outer corners of the lower platform 533 and be shaped to couple with the coupler openings 524 of the upper housing 206. In some embodiments, the couplers 528 may be adapted to snap into the coupler openings 254, or the like.

In exemplary embodiments of the present invention, each of the couplers 528 may comprise a lateral notch guide 521 adapted to enter into the lateral notch 528 of the slide 502 (see FIG. 14). The lateral notch guides 521 may be shaped to enter into the lateral notches 518 and substantially prevent lateral movement the slide 502 when the slide 502 is moving back and forth parallel to a plane defined by a top surface of the top platform 525, or the like. The lower housing 504 may also comprise one or more slide arm guides 527 adapted to receive the slide arms 512 of the slide 502, or the like. In some embodiments, the slide arm guides 527 may comprise a generally rectangular notch positioned between couplers 528 on lateral sides of the lower housing 504. The slide arm guides 527 may be shaped to receive slide arms 512 of the slide 502 and/or guide the slide arms 512 along a path parallel to a plane defined by a top surface of the top platform 525, while restricting the slide arms from moving outwardly laterally away from the center of the lower housing 504 and the spring support 532.

In some embodiments, the lower housing 504 may comprise a spring support 532 extending perpendicularly upwardly away from the lower platform 533 in a center portion of the lower housing 504 between the connector openings 510, or the like. The spring support 532 may be adapted to support a spring 530 or the like that may extend between the housing spring mount 526 and the slide spring mount 514, as described above. The spring support 532 may comprise a curved notch at a top portion furthest away from the lower platform 533 that may be shaped to accept and support a spring 530, while substantially preventing the spring 530 from moving laterally out of the spring support 532, or the like.

In exemplary embodiments of the present disclosure, the lower housing 504 may comprise a lower slide lock 558 adapted to prevent the movement of the slide 502 so that the duplex connector 500 remains coupled with an adaptor while a connector lock 550 is secured within the lower housing 504. The lower housing may comprise a connector lock opening 562 for allowing a connector lock 550 to enter the lock opening 562 and push the lower slide lock 558 upwardly to grab a center slide arm 512, thereby preventing the slide 502 from moving into a position to release the connection with an adaptor, or the like. The lower slide lock 558 may be attached via living hinge to the lower platform 533 or the like, and may be formed to be pushed upwardly by a connector lock 550. The lower slide lock 558 may comprise a tab at the outermost edge wherein the tab may hook a portion of a slide arm 512 and prevent the slide arm 512 from moving toward an adaptor and releasing the connection, or the like. The lower slide lock 558 may be pushed upward into a locked position by a connector lock. The lower slide lock 558 may also be allowed to move downward into an unlocked position when the connector lock 550 is removed.

Figure 20:
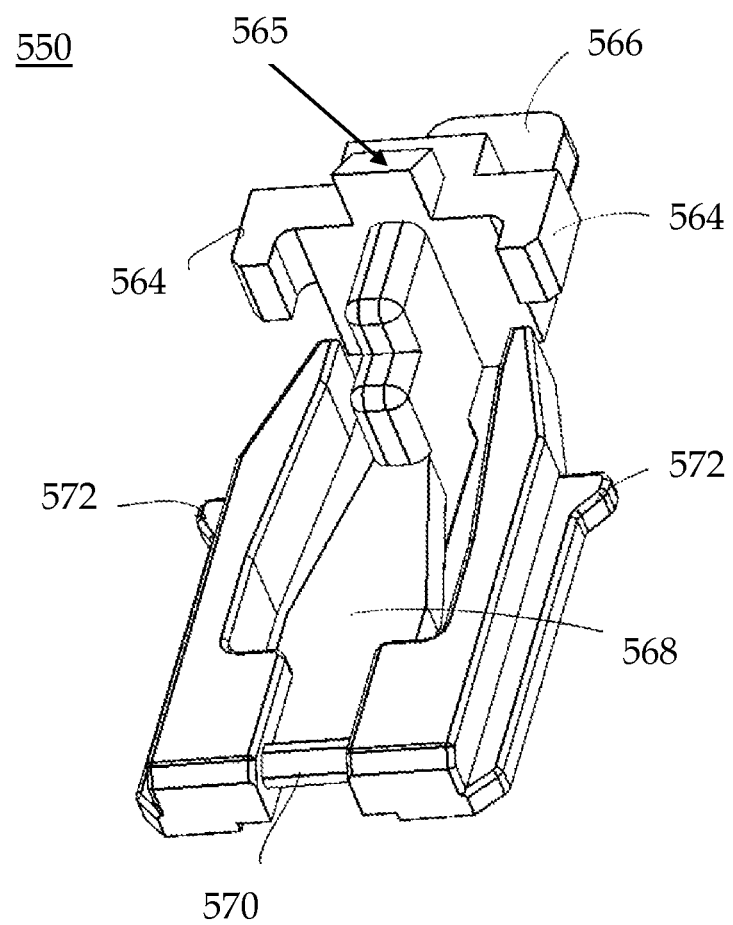
FIG. 20 depicts an elevated perspective view of a connector lock for a duplex optical fiber connector in accordance with exemplary embodiments of the present disclosure.
Figure 21:
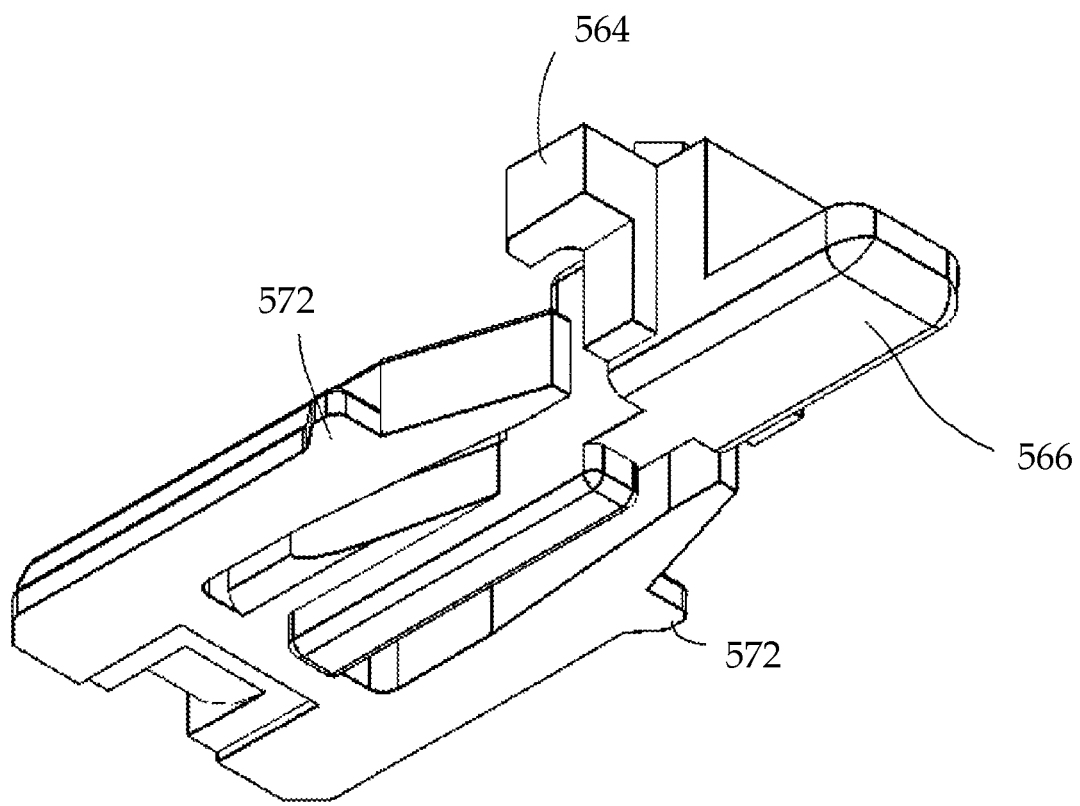
FIG. 21 depicts a bottom perspective view of a connector lock for a duplex optical fiber connector in accordance with exemplary embodiments of the present disclosure.
Figure 22:
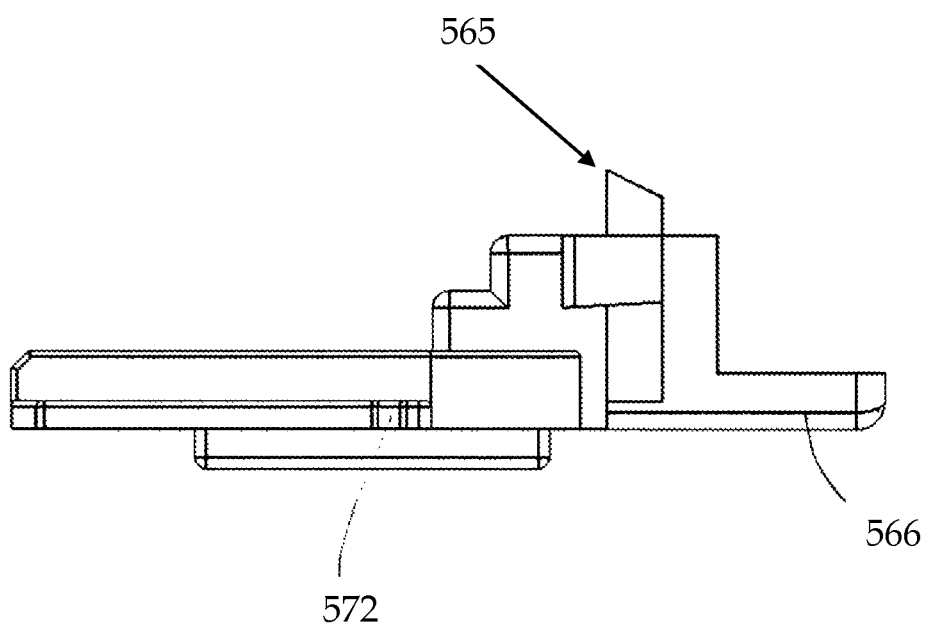
FIG. 22 depicts a side view of a connector lock for a duplex optical fiber connector in accordance with exemplary embodiments of the present disclosure.

Referring now to FIGS. 20-22, views of a connector lock 550 for a duplex optical fiber connector 500 in accordance with exemplary embodiments of the present disclosure is depicted. A connector lock 550 may be adapted to lock the slide 502 and prevent the slide 502 from moving forward and disconnecting the connectors 300 from the adaptor, or the like. A connector lock 550 may be removable via a removal tool, for example, a removal tool 600 depicted in FIG. 23, or the like, or in some embodiments, it may be removable by hand. A connector lock 550 may comprise one or more upper lateral securing members 564, a central securing member 565, a handle 566, an activator 568, a front rim 570, and a lateral guide 572, or the like. In some embodiments, the lateral guides 572 may contract when initially placed in the connector lock opening 562 and then reopen within recesses in the connector lock opening 562, thereby securing the connector lock 550 in place. The lateral guides 572 and/or the handle 566 may be adapted to couple with a release prong 606 of a removal tool 600 (see FIG. 23) and the central securing member 565 may be adapted to be grasped by a support means 608 of a removal tool 600 (see FIG. 23), or the like, to remove the connector lock 550 from the connector lock opening 562, or the like.

Figure 23:
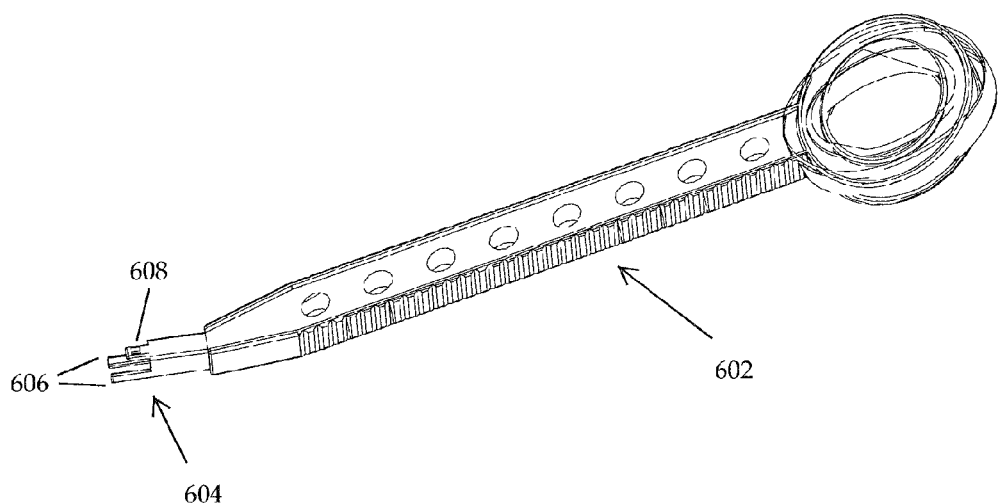
FIG. 23 depicts a perspective view of a removal tool for use with a connector lock for a duplex optical fiber connector in accordance with exemplary embodiments of the present disclosure.

In some embodiments, a removal tool, such as the removal tool 600 depicted in FIG. 23, may latch onto the connector lock 550 and remove the connector lock 550 from the duplex connector 500 when desired. Alternatively a handle 566 protruding from the back of the connector lock 550 may be used to pull the lock 550 out of the duplex connector 500. The connector lock 550 may comprise an activator 568 that may be adapted to push a lower slide lock 558 (See FIG. 18) into position so that a slide 502 is locked into position and prevented from releasing the duplex connector 500 from an adaptor, or the like. In some embodiments the connector lock 550 may comprise a front rim 570 adapted to substantially prevent the connector lock 550 from being removed from the duplex connector 500 without significant force, generally applied by a tool 600 or the like.

The front rim 570 may thereby substantially prevent unintentional disconnections, or the like. The connector lock 550 may also comprise lateral securing guides 572 adapted to guide the connector lock 550 within the connector lock opening so that it is properly vertically aligned, or the like. The lateral guides 572 may protrude from opposing lateral sides of a lower portion of the connector lock 550, or the like.

FIG. 23 depicts a perspective view of a removal tool 600 for use with a connector lock 550 (See FIGS. 20-22) for a duplex optical fiber connector in accordance with exemplary embodiments of the present disclosure. In accordance with embodiments of the present invention, a removal tool 600 generally comprises a handle portion 602 and an engagement portion 604. The handle may be any length, size or shape, provided it is suitable for embodiments of the present invention. The removal tool 600 may be made of any polymer, metal or other substantially rigid material, suitable for embodiments of the present invention.

The engagement portion 604 of the removal tool 600 generally comprises a release prong 606 and a support means 608 for engaging a connector lock, for example, the connector lock 550 depicted in FIGS. 20-22. The engagement portion 604 may comprise a pair of release prongs 606, however such number is generally dictated by the number of release arms on a removal tooled-release connector locking device.

Figure 24:
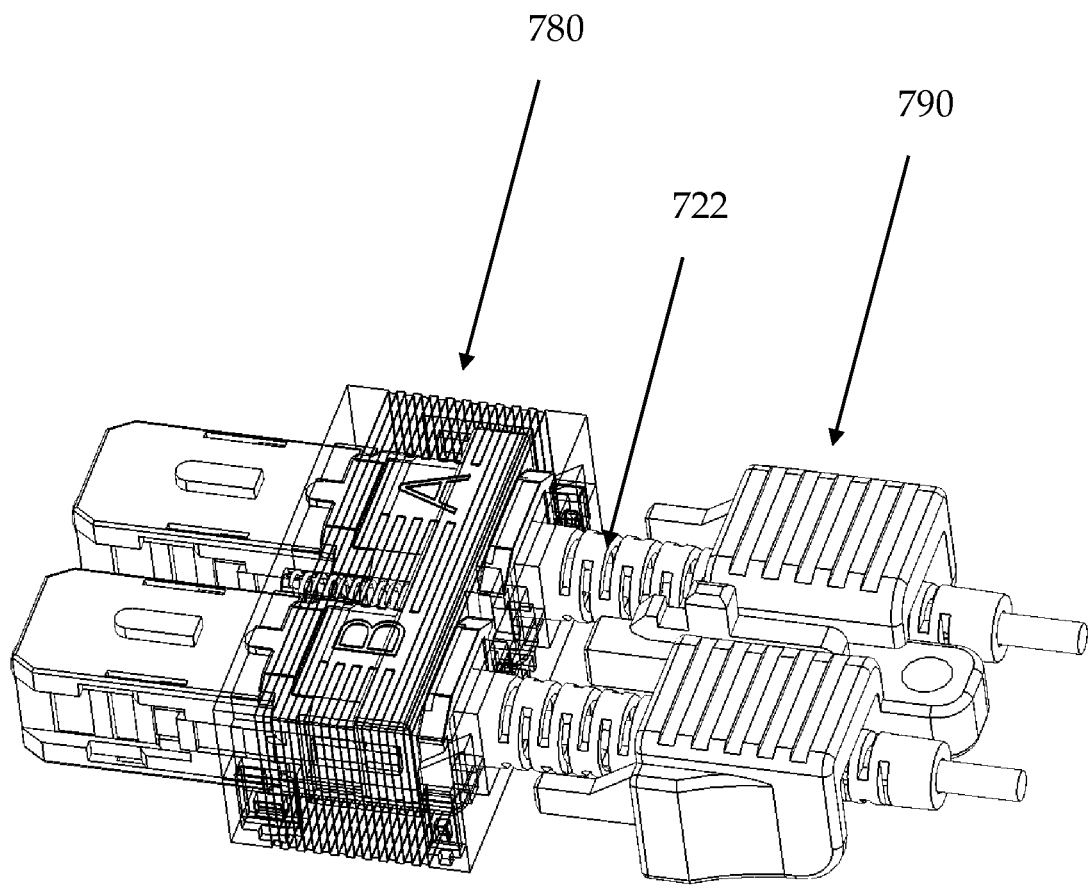
FIG. 24 depicts a perspective view of a duplex optical fiber connector in accordance with exemplary embodiments of the present disclosure.

FIG. 24 depicts a perspective view of a duplex optical fiber connector 700 in accordance with exemplary embodiments of the present disclosure. The main difference between the embodiment depicted in FIG. 24 and the embodiments depicted and described supra, is that a slide is internal to a lower housing and upper housing assembly 780 and cannot be moved without a slide tool 790. As described, supra, in other embodiments, a slide may be moved by hand. In this embodiment, the side is internal so that when the connector 700 is placed in an adaptor, or the like, a connection may be automatically made and a latch may lock a pair of housings in place. The slide tool 790 may be adapted to slide an internal side forward, thereby pushing one or more release members into position to release the connector 700 from a latch and enabling the connector 700 to be removed from the adaptor, or the like.

The handle may be any length, size or shape, provided it is suitable for embodiments of the present invention. The removal tool 600 may be made of any polymer, metal or other substantially rigid material, suitable for embodiments of the present invention. The engagement portion 604 may comprise a pair of release prongs 606, however such number is generally dictated by the number of release arms on a removal tooled-release connector locking device.

In exemplary embodiments, the one or more prongs 374 may comprise a release mechanism 376. A release mechanism 376 may generally comprise any structure adapted to release a connector 300 from a latch, or the like. The release mechanism 376 may comprise a slope, a bump, an angled portion, a curved portion, a round portion, a square portion, a triangular portion, a jagged portion, a toothed portion, a waved portion, or any shape adapted to release the connector 300 from a latch, or the like. In some embodiments, the release mechanism 376 may be formed to push a latch, or the like, away from the connector 300, thereby releasing the connector 300 from an adaptor, or the like. The release mechanism 376 may be any length, size or shape, provided it is suitable for embodiments of the present invention. The release mechanism 376 may be made of any polymer, metal or other substantially rigid material, suitable for embodiments of the present invention. The release member 370 may comprise two release mechanisms 376, however such number is generally dictated by the number of prongs 374 as each prong 374 may comprise a release mechanism 376 or the like. In some embodiments, the release member 370 may not comprise a prong 374, but may still comprise a release mechanism 376.

It is contemplated that any element described herein may comprise any length, width, height, size or shape, provided it is suitable for embodiments of the present invention. The elements described herein may generally be made of any polymer, metal or other substantially rigid material, suitable for embodiments of the present invention.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

While the foregoing is directed to embodiments of the present invention, other and further embodiments of the invention may be devised without departing from the basic scope thereof. It is also understood that various embodiments described herein may be utilized in combination with any other embodiment described, without departing from the scope contained herein.

What is claimed is:

1. A SC fiber connector housing comprising:
an outer housing for securing a fiber connector, the outer housing comprising a first through opening along its length for receiving the fiber connector, the outer housing comprising:
a top wall;
a bottom wall disposed opposite the top side wall; and
a right side wall and a left side wall, each side wall having a second through opening formed to receive a latch of a second connector or an adapter, the side walls comprising a substantially straight portion for maintaining the latch within the respective second through opening; and
a pair of release members slidably coupled with the side walls on surfaces of the outer housing and slidable with respect to the outer housing, each release member comprising:
a base comprising a projection projecting substantially perpendicularly from a side of the base, the projection for pushing the release members toward a second end of the second connector or the adapter into position to release the fiber connector housing from the latch and from a first end of the second connector or the adapter, wherein the first end is substantially opposing to the second end;
two prongs extending from the base, each prong comprising an angled portion disposed at an outermost tip of each of the prongs, the angled portions for releasing the fiber connector housing from the latch by sliding along the side walls and forcing the latch out of the respective second through openings with the angled portions; and
a housing projection extending substantially perpendicularly from a top surface of the top wall.

2. The fiber connector housing of claim 1, wherein the outer housing comprises a pair of latch rests within the second through opening, the latch rests for allowing the prongs to slidably move along the latch rests into position to release the fiber connector housing from the latch.

3. The fiber connector housing of claim 1, wherein the outer housing comprises a pair of lateral guides positioned at a top portion and a bottom portion of each of the side walls, the lateral guides for guiding the base of the release member and allowing the release member to slide within the lateral guides.

4. The fiber connector housing of claim 1, wherein each of the prongs comprises a prong projection extending laterally from the side of each prong; and wherein the outer housing comprises channels positioned on outer lateral edges of the top wall and the bottom wall, the channels for accepting the prong projections and restricting the release members from moving laterally and allowing the release members to slide within the channels.

5. The fiber connector housing of claim 1, wherein the outer housing is integrated into the fiber connector.

6. A SC duplex fiber connector comprising:

a pair of simplex fiber connectors, each simplex fiber connector comprising:

an outer housing for securing a fiber connector, the outer housing comprising a first through opening along its length for receiving the fiber connector, the outer housing comprising:

a top wall;

a bottom wall disposed opposite the top side wall; and a right side wall and a left side wall, each side wall having a second through opening formed to receive a latch of a second connector or an adapter, the side walls comprising a substantially straight portion for maintaining the latch within the respective second through opening; and a pair of release members slidably coupled with side walls, each release member comprising a release mechanism for releasing the fiber connector from the latch from a first end of the second connector or the adapter, by sliding with respect to the outer housing toward a second end of the second connector or the adapter along the side walls and forcing the latch out of the second through openings;

an upper housing and a lower housing, the upper housing and the lower housing coupled together to form a pair of connector openings, wherein the pair of simplex fiber connectors are disposed within the pair of connector openings; and a slide for moving each of the release members substantially simultaneously to release the each of the simplex fiber connectors from the latches.

7. The duplex connector of claim 6, further comprising a connector lock for preventing the slide from moving the release members.

8. The duplex connector of claim 6, wherein when the connector lock is adapted to slide within a back portion of the duplex connector and move a lower slide lock connected to the lower housing into position wherein the lower slide lock blocks movement of the slide; and wherein the connector lock may be removed with a removal tool.

9. The duplex connector of claim 6, wherein the slide comprises one or more slide arms extending from a top platform, the slide arms for coupling with each of the release members and moving the release members into position to release the connectors from the latches.

10. The fiber connector of claim 6, wherein the outer housing comprises a generally rectangular shape with a square cross section.

11. The duplex connector of claim 6, further comprising a slide lock for locking the slide in a release position, wherein all release members are in position to release the connectors from the latches.

12. The duplex connector of claim 6, further comprising a spring, the spring adapted to bias the slide in a position wherein all release members are not in position to release the connectors from the latches.

* * * * *